(12) United States Patent
Hashisho et al.

(10) Patent No.: US 11,356,501 B1
(45) Date of Patent: Jun. 7, 2022

(54) METHOD, APPARATUS, AND SYSTEM FOR DYNAMIC BEACONS ADDRESS ALLOCATION

(71) Applicant: HERE Global B.V., Eindhoven (NL)

(72) Inventors: Basel Hashisho, Berlin (DE); Jerome Beaurepaire, Berlin (DE); Jens Unger, Berlin (DE)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 17/137,033

(22) Filed: Dec. 29, 2020

(51) Int. Cl.
| H04L 67/1001 | (2022.01) |
| G01S 5/02 | (2010.01) |
| B64C 39/02 | (2006.01) |
| H04B 17/318 | (2015.01) |

(52) U.S. Cl.
CPC ........ *H04L 67/1002* (2013.01); *B64C 39/024* (2013.01); *G01S 5/0273* (2013.01); *H04B 17/318* (2015.01); *B64C 2201/12* (2013.01)

(58) Field of Classification Search
None
See application file for complete search history.

(56) References Cited

U.S. PATENT DOCUMENTS

| 9,652,124 | B2 | 5/2017 | Cotier et al. | |
| 2003/0033582 | A1* | 2/2003 | Klein | G06F 16/9024 716/136 |
| 2017/0115121 | A1 | 4/2017 | MacWilliams | |
| 2017/0124883 | A1* | 5/2017 | Modica | G05D 1/0676 |
| 2018/0059659 | A1 | 3/2018 | Takeuchi et al. | |
| 2020/0096345 | A1 | 3/2020 | Jadav et al. | |
| 2020/0162371 | A1* | 5/2020 | Musku | H04L 45/54 |
| 2020/0367133 | A1* | 11/2020 | Matsuura | H04W 4/38 |
| 2021/0144088 | A1* | 5/2021 | Ziv | H04L 45/28 |

OTHER PUBLICATIONS

Ueda et al., "Autonomous Navigation Control of UAV Using Wireless Smart Meter Devices", published in Journal of Telecommunications and Information Technology 2:64-72, Jul. 2019, 10 pages.
Stirling et al., "Indoor Navigation with a Swarm of Flying Robots", published in Proceedings—IEEE International Conference on Robotics and Automation, Nov. 2012, 8 pages.
Hemsworth, "Skyscraper Delivery Drones", published in Tech References: yankodesign, Sep. 20, 2016, 18 pages.

\* cited by examiner

*Primary Examiner* — June Y Sison
(74) *Attorney, Agent, or Firm* — Ditthavong, Steiner & Mlotkowski

(57) ABSTRACT

An approach is provided for dynamic beacons address allocation. The approach involves reporting, by each child node of a beacon tree structure, to a parent node, a load collection packet including a load count of each child node. Each child node is either a leaf node or a parent node. The parent node is either a root node or a child node reporting to another node. The parent node is located on a shortest path from a leaf node to the root node. The load count is a total number of the other nodes reporting to the parent node plus one. The approach also involves receiving, by each child node from the parent node, an address distribution packet that includes a contiguous logical address range and a weighted distance to the root node (WDR). The WDR and/or the tree structure are provided as an input for a drone navigation task.

20 Claims, 24 Drawing Sheets

240

280

540

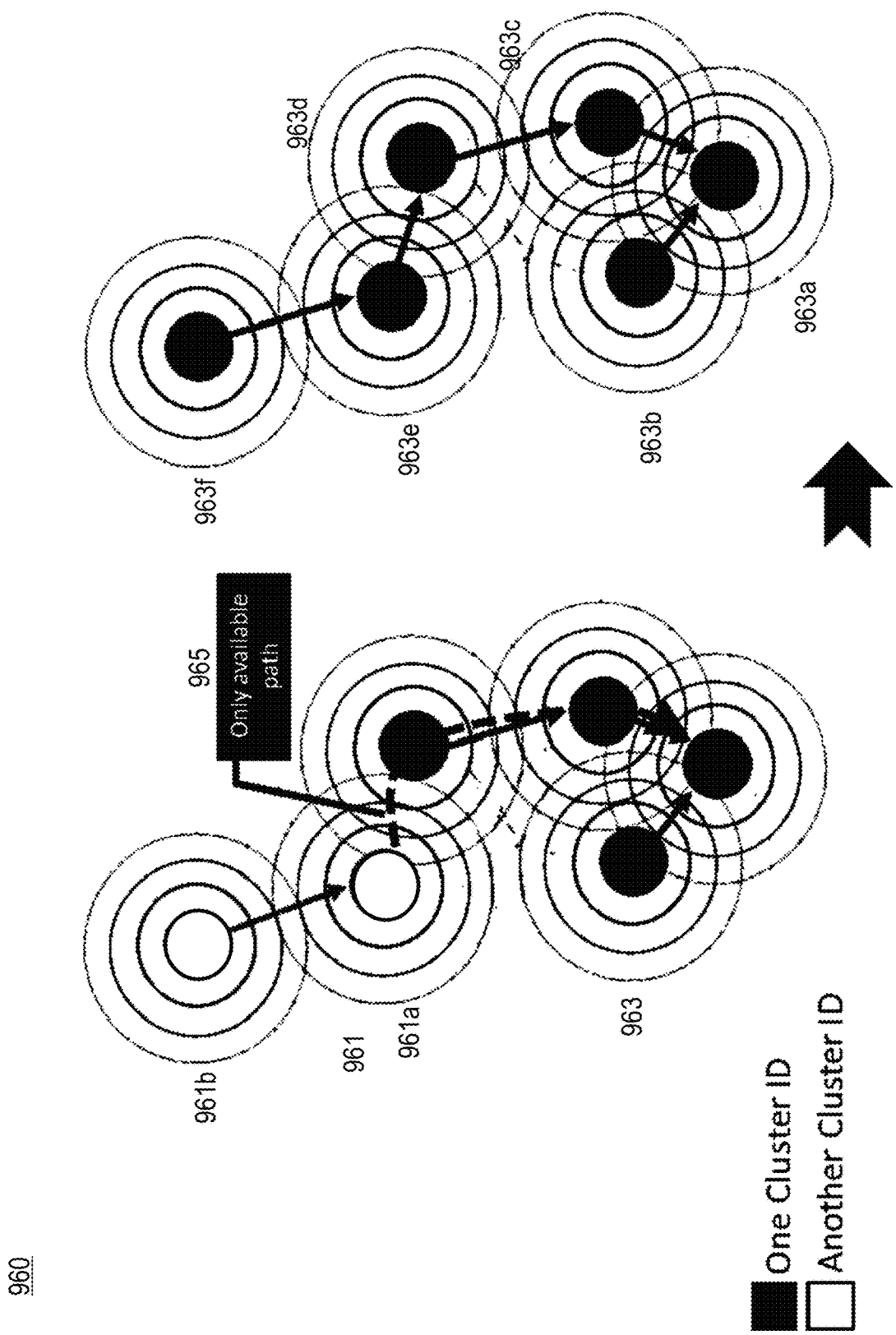

METHOD, APPARATUS, AND SYSTEM FOR DYNAMIC BEACONS ADDRESS ALLOCATION

BACKGROUND

Last mile delivery of goods to customers (e.g., delivery of goods from a nearest delivery transportation hub to the final destination) presents significant technical challenges to delivery and logistics service providers. Historically, delivery services have relied on highly experienced drivers to make last mile delivery to given addresses/locations. Delivery drones becomes popular to transport packages, medical supplies, food, or other goods to given addresses/locations. However, to make drone deliveries possible to mobile targets (e.g., people) such as inside large offices or skyscrapers, service providers need to provide guidance for drones to a mobile three-dimensional target location inside given buildings. Accordingly, service providers face significant technical challenges to find technical solutions that can automatically and dynamical locate a mobile target (e.g., a package recipient) in a building to improve the efficiency of last mile delivery.

SOME EXAMPLE EMBODIMENTS

Therefore, there is a need for an approach for dynamic beacons address allocation, which, for example, can support drone delivery (e.g., to mobile targets) using beacon positioning.

According to one embodiment, a method comprises determining at a drone a cell where a target beacon associated with a domain is located. The method also comprises upon reaching the cell, transmitting a destination identifier associated with the target beacon from the drone to a domain beacon of the domain in the cell. The method further comprises receiving, by the drone, a guiding signal from the domain beacon to reach the target beacon.

According to another embodiment, an apparatus comprises at least one processor, and at least one memory including computer program code for one or more computer programs, the at least one memory and the computer program code configured to, with the at least one processor, cause, at least in part, the apparatus to determine at a drone a cell where a target beacon associated with a domain is located. The apparatus is also caused to, upon reaching the cell, transmit a destination identifier associated with the target beacon from the drone to a domain beacon of the domain in the cell. The apparatus is further caused to receive, by the drone, a guiding signal from the domain beacon to reach the target beacon.

According to another embodiment, a computer-readable storage medium carries one or more sequences of one or more instructions which, when executed by one or more processors, cause, at least in part, an apparatus to determine at a drone a cell where a target beacon associated with a domain is located. The apparatus is also caused to, upon reaching the cell, transmit a destination identifier associated with the target beacon from the drone to a domain beacon of the domain in the cell. The apparatus is further caused to receive, by the drone, a guiding signal from the domain beacon to reach the target beacon.

According to another embodiment, an apparatus comprises means for determining at a drone a cell where a target beacon associated with a domain is located. The apparatus also comprises means for upon reaching the cell, transmitting a destination identifier associated with the target beacon from the drone to the domain beacon of a domain in the cell. The apparatus further comprises means for receiving, by the drone, a guiding signal from the domain beacon to reach the target beacon.

According to one embodiment, a method comprises reporting, by each child node of a tree structure, to a parent node of said each child node, a load collection packet including a load count of said each child node. Each node associated via the tree structure is a beacon. The each child node is either a leaf node without any other nodes reporting thereto or a parent node with one or more other nodes reporting thereto. The parent node is either a root node without reporting to any other nodes in the tree structure or a child node reporting to another node in the tree structure. The parent node is located on a shortest path from a leaf node to the root node measured based at least on beacon signal strengths. The load count is a total number of the one or more other nodes reporting to the parent node plus one. The method also comprises receiving, by said each child node from the parent node, an address distribution packet that includes a contiguous range of logical addresses and a weighted distance to the root node. The weighted distance of said each child node to the root node, the tree structure, or a combination thereof are provided as an input for a drone navigation task.

According to another embodiment, an apparatus comprises at least one processor, and at least one memory including computer program code for one or more computer programs, the at least one memory and the computer program code configured to, with the at least one processor, cause, at least in part, the apparatus to report, by each child node of a tree structure, to a parent node of said each child node, a load collection packet including a load count of said each child node. Each node associated via the tree structure is a beacon. The each child node is either a leaf node without any other nodes reporting thereto or a parent node with one or more other nodes reporting thereto. The parent node is either a root node without reporting to any other nodes in the tree structure or a child node reporting to another node in the tree structure. The parent node is located on a shortest path from a leaf node to the root node measured based at least on beacon signal strengths. The load count is a total number of the one or more other nodes reporting to the parent node plus one. The apparatus is also caused to receive, by said each child node from the parent node, an address distribution packet that includes a contiguous range of logical addresses and a weighted distance to the root node. The weighted distance of said each child node to the root node, the tree structure, or a combination thereof are provided as an input for a drone navigation task.

According to another embodiment, a computer-readable storage medium carries one or more sequences of one or more instructions which, when executed by one or more processors, cause, at least in part, an apparatus to report, by each child node of a tree structure, to a parent node of said each child node, a load collection packet including a load count of said each child node. Each node associated via the tree structure is a beacon. The each child node is either a leaf node without any other nodes reporting thereto or a parent node with one or more other nodes reporting thereto. The parent node is either a root node without reporting to any other nodes in the tree structure or a child node reporting to another node in the tree structure. The parent node is located on a shortest path from a leaf node to the root node measured based at least on beacon signal strengths. The load count is a total number of the one or more other nodes reporting to the parent node plus one. The apparatus is also caused to receive, by said each child node from the parent node, an address distribution packet that includes a contiguous range of logical addresses and a weighted distance to the root node. The weighted distance of said each child node to the root node, the tree structure, or a combination thereof are provided as an input for a drone navigation task.

According to another embodiment, an apparatus comprises means for reporting, by each child node of a tree structure, to a parent node of said each child node, a load collection packet including a load count of said each child node. Each node associated via the tree structure is a beacon. The each child node is either a leaf node without any other nodes reporting thereto or a parent node with one or more other nodes reporting thereto. The parent node is either a root node without reporting to any other nodes in the tree structure or a child node reporting to another node in the tree structure. The parent node is located on a shortest path from a leaf node to the root node measured based at least on beacon signal strengths. The load count is a total number of the one or more other nodes reporting to the parent node plus one. The apparatus also comprises means for receiving, by said each child node from the parent node, an address distribution packet that includes a contiguous range of logical addresses and a weighted distance to the root node. The weighted distance of said each child node to the root node, the tree structure, or a combination thereof are provided as an input for a drone navigation task.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 9A-9E are diagrams illustrating beacon clustering examples, according to various embodiments;

DESCRIPTION OF SOME EMBODIMENTS

Examples of a method, apparatus, and computer program for dynamic beacons address allocation and drone delivery using beacon positioning are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
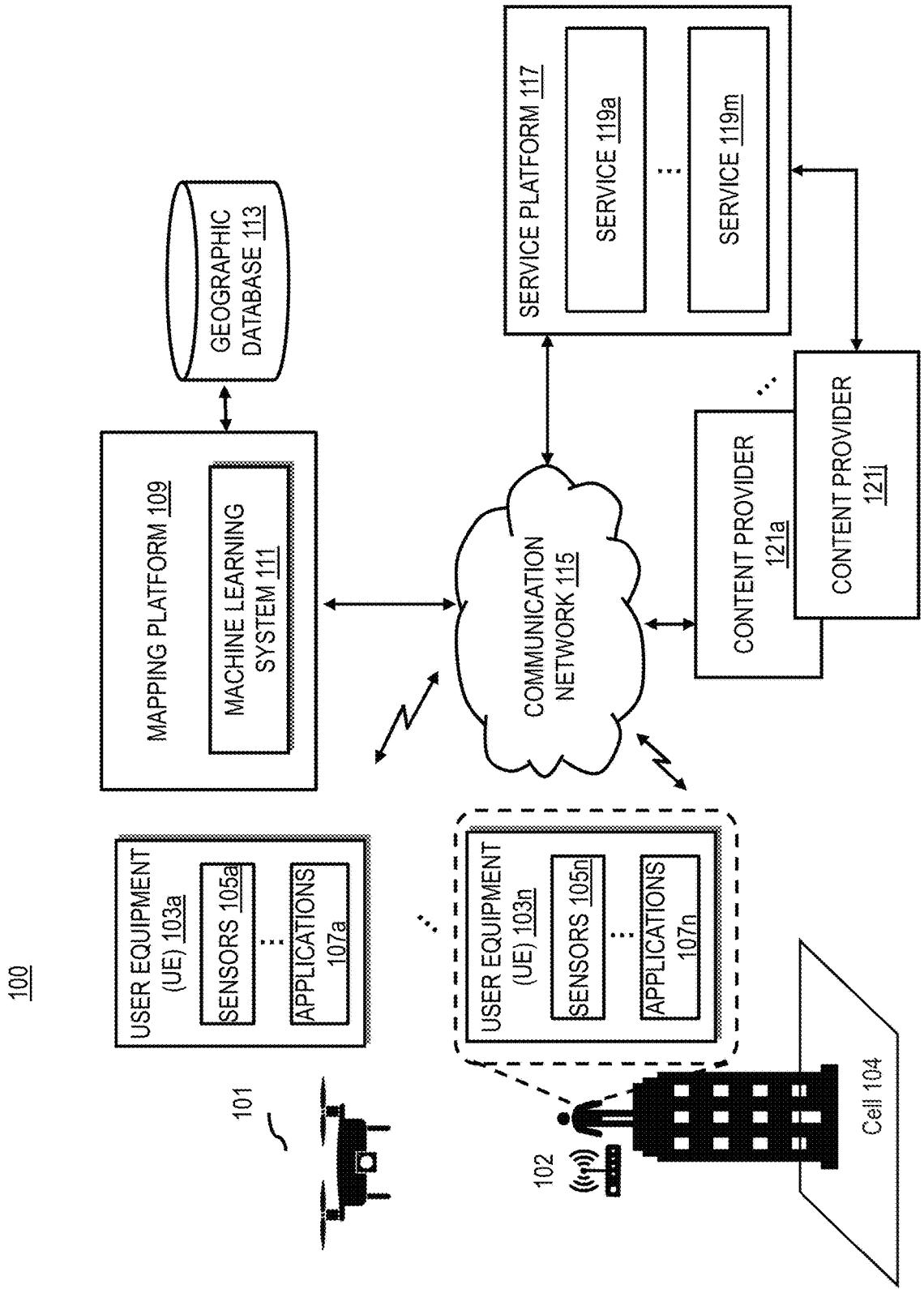
FIG. 1 is a diagram of a system capable of dynamic beacons address allocation and drone delivery using beacon positioning, according to one embodiment.

FIG. 1 is a diagram of a system 100 capable of dynamic beacons address allocation and drone delivery using beacon positioning, according to one embodiment. Last mile delivery refers to the transportation of goods from a transportation hub to a final destination (e.g., a customer's home or business). In other words, a "last mile delivery" is typically the last leg of a delivery route that a delivery service uses to transport goods from its origin to a final destination. By way of example, a delivery service will often establish transportation hubs along delivery routes near its customers so that goods can be collected at origin transportation hubs for more efficient mass transport to destination transportation hubs. The collection and aggregation of goods for mass transport enables the delivery service to use larger transportation means (e.g., cargo planes, trains, larger cargo trucks, etc.) that are more efficient and cost effective for transporting goods between transportation hubs. Then when goods reach the destination transportation hub, the delivery service can switch to smaller delivery vehicles (e.g., a delivery vehicle such as but not limited to smaller trucks, vans, delivery drones, autonomous robots, etc.) for last mile delivery to the final destination. This last mile delivery is often performed by smaller vehicles because they can more efficiently travel to multiple final destinations that vary with the goods (as opposed to traveling on routes between fixed transportation hubs).

Because of its variable and dynamic nature, delivering goods on a last mile delivery traditionally involves constant decision making by a human driver, such as where to park, how to obtain recipient signatures, etc. On the other hand, modern delivery drones and/or robots can deliver goods, particularly in urban high-rise buildings, directly to a target address/location. In addition, with proper guidance, the delivery drones and/or robots can deliver to a mobile target (e.g., a mobile device user) in facilities (e.g., urban high-rise buildings). As a result, service providers face significant technical challenges to providing guidance to delivery drones and/or robots to efficient last mile delivery to mobile targets.

To address this problem, the system 100 of FIG. 1 introduces the capability to dynamically allocate logical addresses to beacons and to support drone delivery (e.g., to mobile targets) using beacon positioning. In one embodiment, the system 100 can guide a drone 101 using one or more beacons 102 to one or more user equipment (UE) devices 103a-103n (also referred to as UEs 103—such as smart phones). A beacon can include one or more transceivers that send wireless signals to and receive wireless signals from other devices nearby. Beacon signals can include radio, infrared, ultrasonic, optical, laser, or other types of signals that indicate the proximity or location of a device and/or its readiness to perform a task. Beacon signals can carry critical and/or constantly changing parameters, such as power-supply information, relative address, location, timestamp, signal strength, available bandwidth resources, temperature, pressure, etc. Beacon signals are transparent to users, yet integrated into scientific and commercial applications, such as mobile networks, search-and-rescue operations, location-tracking systems, etc. In one embodiment, the system 100 can deploy beacons as sensor nodes capable of performing processing, gathering sensory information, and communicating with other connected nodes in a beacon cluster/network, and add new beacon functionalities by guiding drones to deliver packages, medical supplies, food, or other contents to targets.

By way of example, the UE 103 can be carried by a user, and the drone 101 is assigned to deliver a package to the user while the user is located in a facility (e.g., a building) within a cell 104. In one embodiment, the system 100 can geographically partition an area of interest (e.g., a building, a mall, a warehouse, a community, a city, a country, the globe, etc.) into to cells based on a grid-modeling strategy or any other predetermined scheme(s). In another embodiment, the system 100 adopt an existing grid-modeling strategy, such as a discrete global grid (DGG). The DGG (e.g., the S2 Grid System, Geohash, ISO 6709, H3 hexagonal hierarchical spatial index, etc.) can include hierarchical and non-hierarchical grids that identify a cell of required dimensions.

In one embodiment, the cells can be dimensioned (e.g., sized, shaped, etc.) such that the range(s) of radio frequency technologies used by the beacons is sufficient to be picked up when the drone 101 arrives the cell. For instance, the radio signal of the root/gateway can be detectable in a direction or a directional range that the drone 101 is coming in to be picked up by the drone 101. The radio signal strength of the root/gateway can be the same or similar to the remaining tree nodes, to be detectable within a certain vicinity around that node by other nodes and the drone 101. The root/gateway can be located through a variety of geographical addressing systems (e.g., the grid-modeling strategy or any other predetermined scheme(s)), and the drone 101 can have a positioning mechanism within the addressing system/schema to navigate its way to the root/gateway address.

By way of examples, cells can be tiles, hexagons, or any other suitable tessellation. One commercial example of such addressing would be what3words.com). The cell dimensions (e.g., size, shape, etc.) of the commercial example can be adapted such that its RF range is sufficient to be picked up by the drone 101 arriving the cell. Such spatial partitions/cells can be assigned with identifiers and matched with a location to be reached by the drone 101 while in a coverage of outdoor positioning means, such as the global navigation satellite system (GNSS).

In another embodiment, the cell can be a wireless communication cell. In this case, the wireless communication cells require a dynamic reference, as there may be overlaps in reception, and base stations can be assigned new identifiers, upgraded, etc. accordingly.

The UEs 103 can be phones, tablets, personal digital assistants (PDAs), smart watches, navigation devices, drones, smart glasses, vehicle-mounted cameras, smart clothing with camera, body-worn cameras, hands-free cameras, as well as other network-connected probe devices that are mobile in the facility. Although various embodiments are described with respect to a drone, it is contemplated that the approach described herein may be used with other unmanned aerial vehicles, autonomous robots, etc.

Figure 2A:
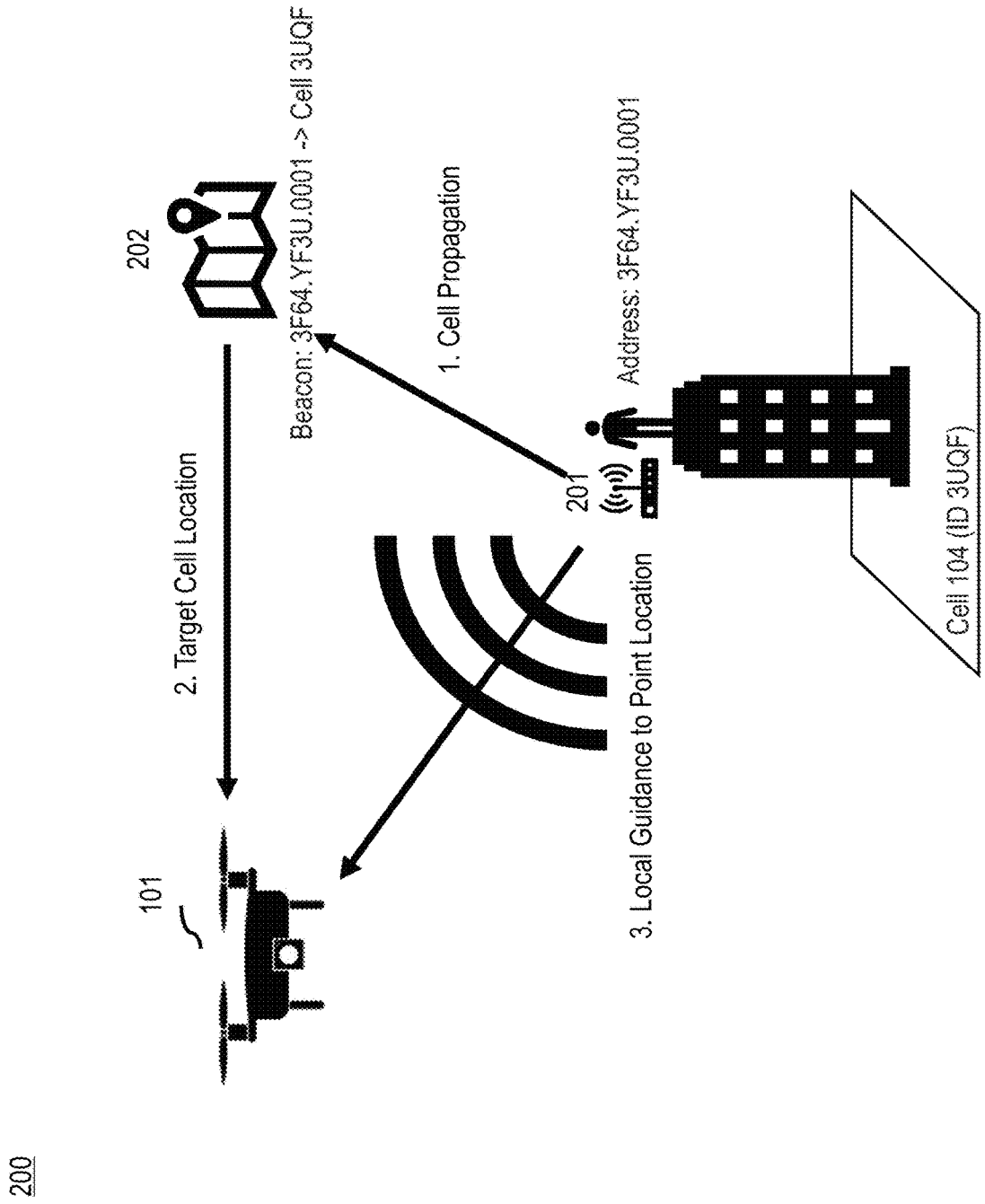
FIG. 2A is a diagram illustrating an example drone delivery using single-beacon positioning, according to one embodiment.

FIG. 2A is a diagram 200 illustrating an example drone delivery using single-beacon positioning, according to one embodiment. In one embodiment, the system 100 can provide accurate assisted guidance using beacon(s) for the drone 101 to a three-dimensional (3D) location of the UE 103, without user intervention (e.g., the user does not need to provide the 3D location for delivery).

By way of example, a mobile target (e.g., the UE 103) is located on the balcony of the 7th floor of a building that is facing south east, and can communicate with nearby cell towers through radio frequency waves. The system 100 can know which cell the UE 103 is located by mapping location sensor data, probe data, etc. of the UE 103 with the grid-modeling strategy or other predetermined scheme(s), and determining a corresponding cell ID of the UE 103. Although various embodiments are described with respect to radio frequency beacons, such as Bluetooth, Wi-Fi, near field communication, ultra-band, Zigbee, etc., it is contemplated that the approach described herein may be used with infrared or other wireless signals. Considering availability and suitable operation ranges, radio frequency devices, especially Wi-Fi, can be more significant for implementing the system 100.

Under some scenarios, the UE 103 may not be able to communicate with cellular signals, such as without cellular communication capabilities, cellular communication turned off, or its current location (e.g., indoors, underground, etc.) with no or week cellular signals. The UE 103 can still use short-range wireless communication, such as Bluetooth, Wi-Fi, infrared, near field communication, ultra-band, Zigbee, etc., to communicate with a gateway/domain beacon 201 in FIG. 2A. The system 100 can know which cell the UE 103 is located based on cell propagation and target cell location processes and then guide the drone 101 to the UE 103.

For cell propagation, an owner (e.g., a company) of the gateway beacon 201 can get a domain address (e.g., 3F64.YF3U), and then the gateway beacon 201 can issue sub addresses to itself and beacons in the domain (e.g., the gateway beacon with an address: 3F64.YF3U.0001). The system 100 can register in a domain database 202 the domain (e.g., 3F64.YF3U) in its respective cell (e.g., Cell 104 with an ID 3UQF) as Gateway Beacon: 3F64.YF3U.0001 and UE 103 in Cell 3UQF. The cell can be defined via any geocoding systems, such as geohash. Under geohash, an address (e.g., of a delivery package) or latitude/longitude coordinates (e.g., of the UE 103) can be geo-coded in a cell.

As later described in conjunction with FIGS. 2C-2E, one or more beacon tree structures/clusters can be formed in one domain using a logical address distribution protocol for clustering beacons, and more than one domain can exist in one cell. Such domains allow for beacon trees co-exist for different purposes, such as drone delivery, navigation to parked vehicles, locating misplaced UEs, etc. In one embodiment, the system 100 can use domains to specify which beacons are to be considered (or ignored) for reconfiguring (e.g., using the logical address distribution protocol) the beacon trees.

For a target cell location, the system 100 can receive a query from the drone 101 for the cell location of the target (e.g., the UE 103), and the system 100 can then use an ID (e.g., a media access control (MAC) address) of the UE 103 to locate the current cell of the gateway beacon/target using the domain database 202. In another embodiment, the drone 101 can store the domain database 202 of all cells mapped to grid locations and ask the system 100 for a target cell (e.g., Cell 3UQF) to deliver.

For local guidance, once the drone 101 is in the cell 104, the gateway beacon 201 can radio the drone 101 to the exact location of the UE 103 in a 3D space, for example, using a line of sight (LoS) infrared guidance. In another embodiment, the drone 101 can scan for the gateway beacon 201 in that cell 104, and obtain further information about the UE 103 within the cell.

Figure 2B:
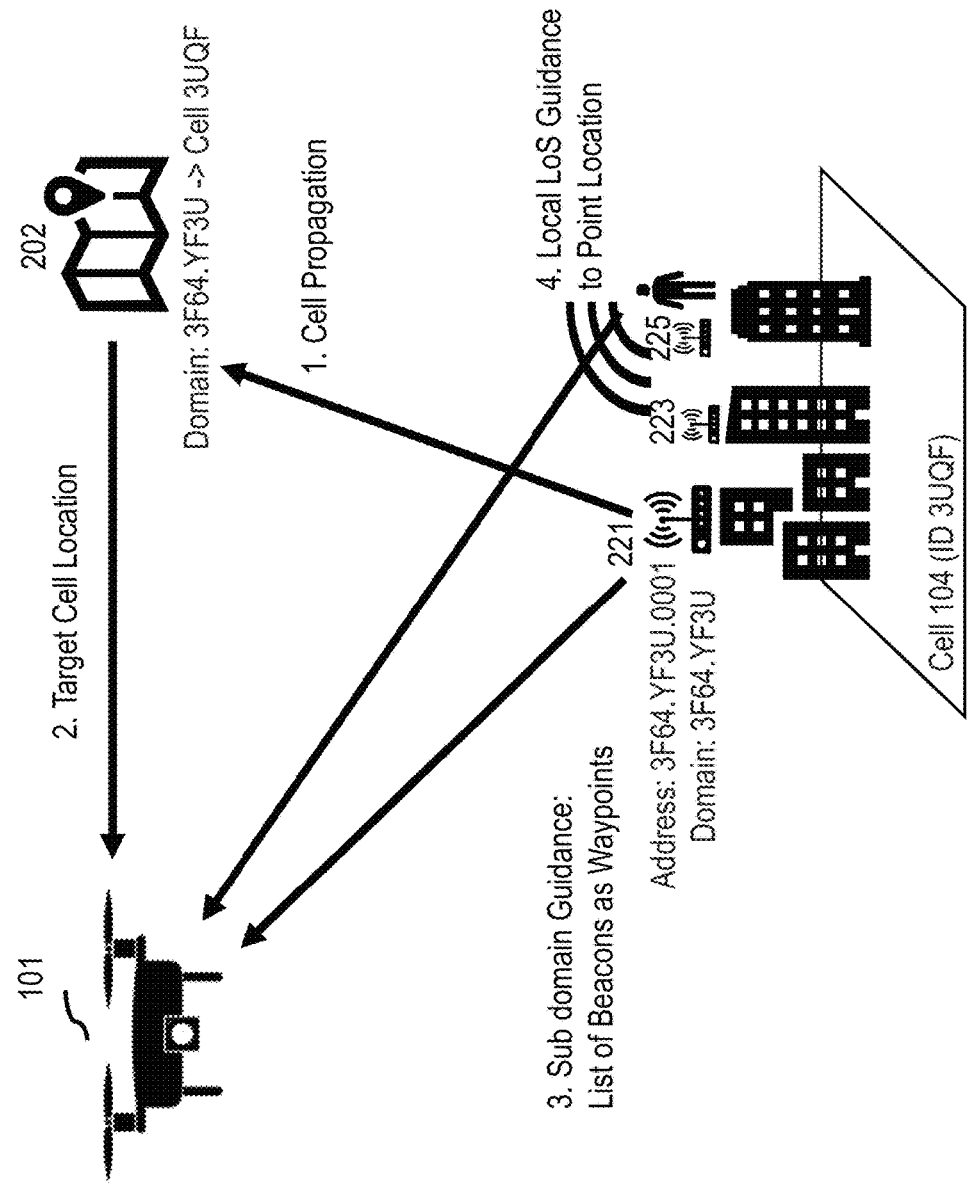
FIG. 2B is a diagram illustrating an example drone delivery using multi-beacon positioning, according to one embodiment.

FIG. 2B is a diagram 220 illustrating an example drone delivery using multi-beacon positioning, according to one embodiment. As shown in FIG. 2B, there are other beacons in addition to a gateway/domain beacon 221. After the same cell propagation process and target cell location process in FIG. 2A, FIG. 2B involves sub-domain guidance via a list of intermediate beacons (e.g., beacons 223, 225) as waypoints, before the local guidance to the target point/location. Once in the cell, the gateway/domain beacon 221 radios/guides the drone 101 to one or more waypoints/hops/nodes which, one-after-the other, radios/guides the drone 101 to a target beacon (e.g., beacon 225). In one embodiment, the target beacon can guide the drone 101 with LoS infrared guidance to the exact location of the UE 103. In another embodiment, the drone 101 can follow a radio signal specified for the UE 103 until the respective received signal strength reaches a maximum value. In other embodiments, the drone 101 can use optical means to scan/recognize a code, a logo (e.g., of the delivery service), a (locally) unique feature, etc. associated with the delivery and placed near or on the UE 103.

To effectively guide drones, beacons provide precise navigation target identification, including situations where coordinates/GNSS are imprecise or unavailable. However, assigning the beacons with usable location references is challenging. In one embodiment, the system 100 can enable a self-clustering and address-assigning scheme via a logical address distribution protocol based on radio frequency strengths perceived by the beacons, etc. Therefore, the logical address distribution protocol can automatically propagate beacon cluster(s) and assign beacon IDs ad hoc. Once such ad hoc network is spontaneously formed, the beacons connect and communicate with each other directly instead of relying on a base station or access points as in wireless LANs for data transfer co-ordination. Each beacon participates in routing activities, by determining the route using one or more routing algorithms and forwarding data to one or more other beacons via this route. By way of example, the beacon IDs are associated with a location grid cell (e.g., Cell 104 with an ID 3UQF) for drone delivery as described in FIGS. 2A-2B.

In one embodiment, the logical address distribution protocol for clustering beacons (which can support, e.g., drone delivery) deploys a single-source multi-destination routing algorithm that includes (1) a load collection wave for each child beacon to report its load to a parent beacon, and (2) an address distribution wave for a root beacon to assign beacon identifiers (IDs) to beacons in a tree structure. Under the logical address distribution protocol, beacons constantly (re)try to cluster together using packets thereby forming a tree structure cluster. For instance, the logical address distribution protocol can use 2.4 GHz radio frequency (RF) for packet transmission/reception at a physical layer, and embed beacon MAC addresses (6 bytes) in the packets of a predetermined size (e.g., as small as few tens of bytes) at a data link layer.

At a network Layer, the logical address distribution protocol can specify: (1) communications only between a parent and its direct children, (2) no direct transmissions between siblings or grandparents/children, (3) a node communicates with its children through multi MAC broadcast, (4) a child communicates with its parent through a single MAC (the parent's) address, (5) packets are transmitted periodically at a specific interval, (6) packet receiving nodes have the chance to update their states based on received data and internal timer(s), construct and transmit its packet once its transmission time slot is due, (7) a transmitted packet contains information to the node's children and parent as well, (8) due to parent-child-parent data exchange, information flows as waves from leaf nodes to the root node and vice-versa, and (9) a node transmission time slot is local per node. It relies on random access to the RF channel, and continuous retransmission of the same state each time to overcome possible collisions or transmission errors.

Regarding beacon logical addresses (e.g., routing addresses), the logical address distribution protocol can specify: (1) Single digit integers, (2) a size of the integer represents the address range (e.g., 1 byte=>255 nodes can be within the entire cluster), (3) dynamically reassigned whenever the tree structure changes, (4) used to assist routing/navigation through the shortest path from the root node to a destination logical address, (5) generated and dispatched through an address distribution wave, etc. In addition, the logical address distribution protocol provides an order registration mechanism that can assign/resolve a node logical address from an Order ID. After the logical addresses are assigned to beacons, when the drone 101 reaches the cell 104 and joins the cluster communications via the gateway/domain beacon 221, the gateway/domain beacon 221 or intermediate node(s)/beacon(s) can start guiding the drone 101 to reach a target beacon/node (e.g., UE 103), and/or the drone 101 can trace subsequent beacons towards the target beacon/node. The system 100 thus enables flexible drone deliveries to mobile targets. In addition, the system 100 can dynamically adapt the beacon cluster graphs to the environment, for example, based on a shortest path algorithm/formula considering received signal strengths (RSS), reception orientations and/or coverages, broadcasting orientations and/or coverages, a number of hops, physical distances between nodes, etc.

Figure 2C:
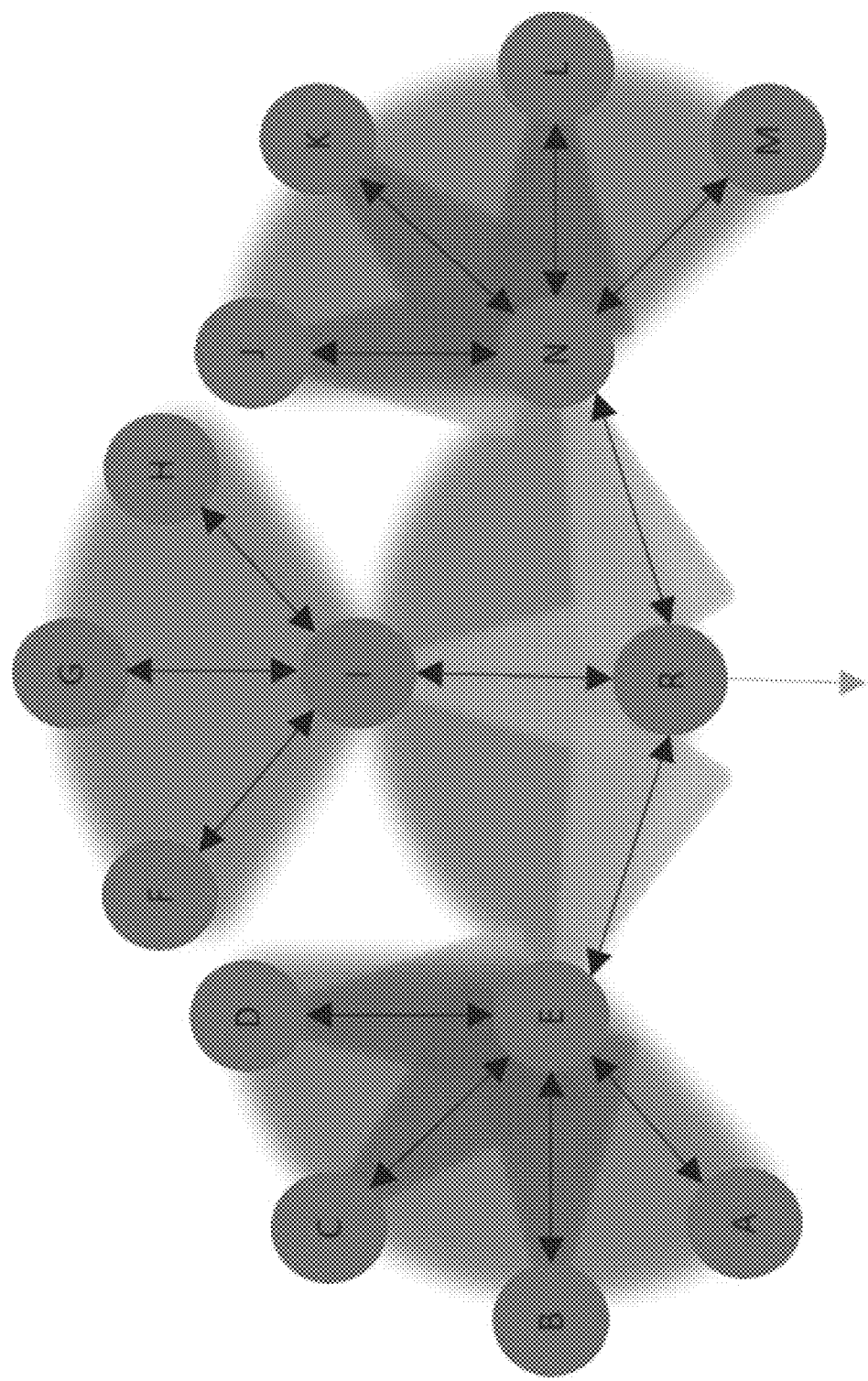
FIG. 2C is a diagram illustrating an example beacon tree structure built using a logical address distribution protocol for clustering beacons, according to one embodiment.

FIG. 2C is a diagram illustrating an example beacon tree structure built using a logical address distribution protocol for clustering beacons, according to one embodiment. For instance, a resulting tree 240 in FIG. 2C can resemble a bi-directional non-acyclic graph including a root node R connected with three parent nodes E, I, N that are in turn connected with their child/leaf nodes. The parent node E is connected with leaf nodes A, B, C, D. The parent node I is connected with leaf nodes F, G, H. The parent node M is connected with leaf nodes J, K, L, M. The root beacon R is the source node of the graph, and is the physical entry point to the tree structure 240 (i.e., a cluster). In one embodiment, the single-source multi-destination routing algorithm can have each beacon transmit packets to and receive packets from neighboring beacons to determine the shortest path to the root beacon R using a shortest path algorithm/formula (e.g., a Dijkstra's algorithm) that can be bases on received signal strengths (RSS), reception orientations and/or coverages, broadcasting orientations and/or coverages, a number of hops, physical distances between nodes, etc.

Figure 2D:
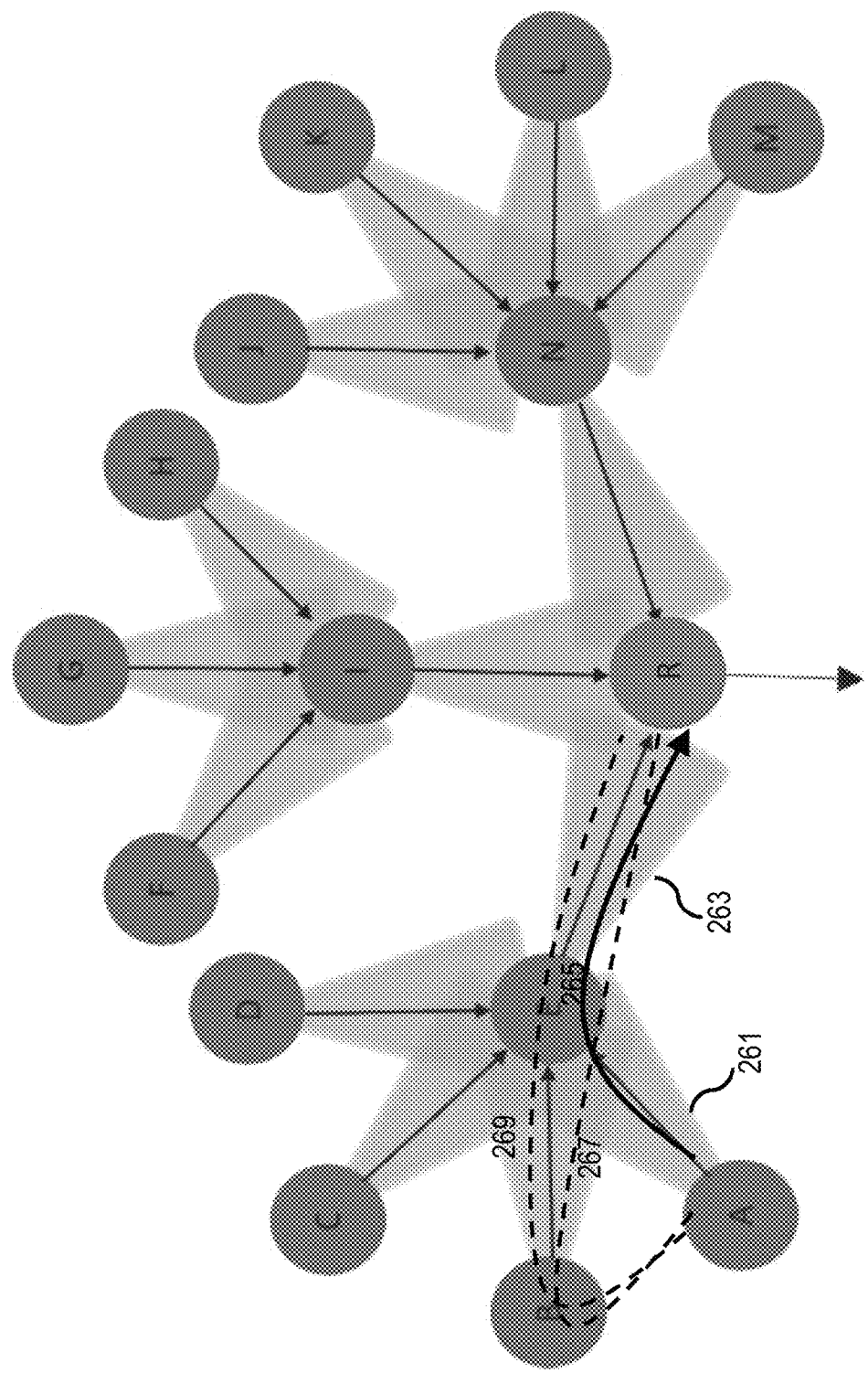
FIG. 2D is a diagram illustrating an example load collection wave of a logical address distribution protocol for clustering beacons, according to one embodiment.
Figure 2E:
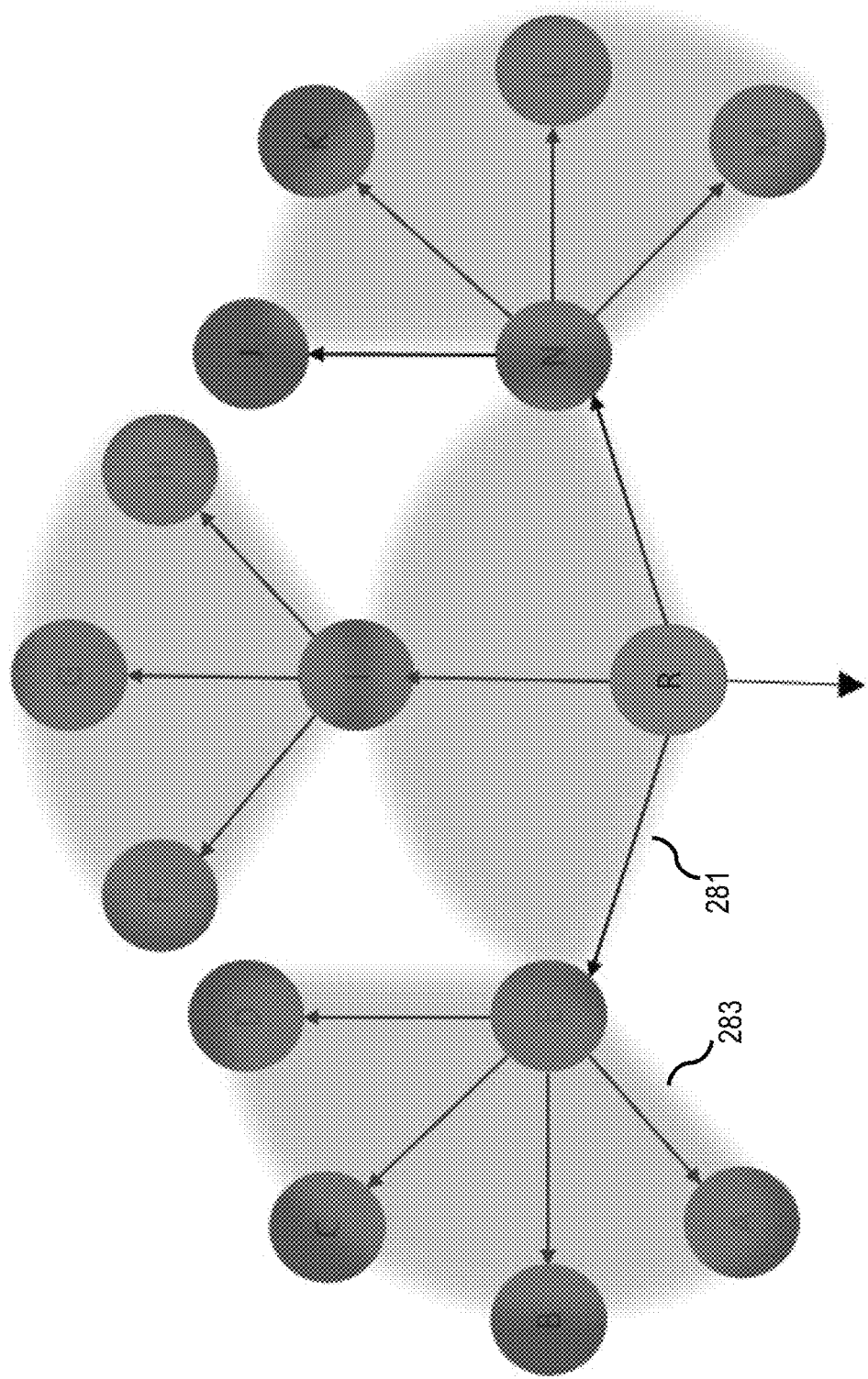
FIG. 2E is a diagram illustrating an example address distribution wave of a logical address distribution protocol for clustering beacons, according to one embodiment.

In FIGS. 2C-2E, load collection packets and address distribution packets are addressed using source/destination physical addresses, such as MAC addresses, while logical/routing addresses are integers starting from 0 up to an implementation-specific size. The root beacon is the source node of the graph, and is the physical entry point to the cluster, and the root beacon's MAC address can be used as the cluster's unique ID.

FIG. 2D is a diagram illustrating an example load collection wave 260 of a logical address distribution protocol for clustering beacons, according to one embodiment. For instance, the logical address distribution protocol is a tree-sweeping protocol, and the load collection wave 260 can start from each child node (e.g., nodes A, B, C, D, F, G, H, J, K, L, M) reporting its load count (i.e., a total number of child node(s) it has plus itself, e.g., one) upwards to a parent node (e.g., nodes E, I, N) using for example, a load collection packet (e.g., a packet 261) during a first broadcast interval of the load collection wave 260. Each parent node (e.g., node E) can sum the reported loads (e.g., nodes A, D, C, D=4) and report its total load count (e.g., 4+E itself=5) to its parent node (e.g., node R) using a load collection packet (e.g., a packet 263) during the next broadcast interval of the load collection wave 260. The reporting process repeats until reaching the root node R, where the address distribution wave starts.

Taking child node A as an example, during the first broadcast interval, all, or some of the other nodes in the cluster may receive the load collection packet 261 from node A, depending on one or more load collection parameters such as node physical distances, a minimum signal receiving strength threshold of the other node, a reception orientation/coverage of the other node, a maximum signal transmission strength threshold of node A, a broadcasting orientation/coverage of node A, etc. The broader the load collection packet 261 is broadcasted (e.g., a wider coverage and/or a stronger packet signal that consuming more power resources), the more other nodes receive the packet 261 from node A, the bigger the cluster can grow yet longer time to build. On the other hand, the more focused the broadcast of the load collection packet 261 (e.g., a smaller coverage and/or a weaker packet signal that consuming less power resources as shown in FIG. 2D), the fewer other nodes receive the packet 261 from node A, the smaller the cluster can grow yet shorter time to build.

In some embodiments, these load collection parameters can be selected according to a heuristic (e.g., based on different area characteristics such as office buildings, malls, warehouse, farms, etc.) and/or a machine learning model. By way of example, the system 100 can match successful delivery statistics to a machine learning model including parameters of building shapes/dimensions e.g., building height Z, with Footprint (X, Y), and use load collection parameters in those buildings, e.g., a received signal strength (RSS) [A,B] dB, a node hop number N, yield C %, etc. of successful deliveries, to find A, B, and N for a building defined with X, Y, Z, to maximize C. In addition, these parameters can be applied to define a weighted distance to root (WDR) of a beacon node for clustering beacons into tree(s) as later discuss in conjunction with FIG. 2E.

In addition, these load collection parameters can be dynamically adjust based on changes of the regional characteristics. For instances, the area characteristics can include beacon distributions (e.g., locations, density, models, etc.), target distributions (e.g., locations, density, models, etc.), facility signal penetration characteristics (e.g., locations, signal penetration data, building materials, etc.), etc.

Since nodes C, D, F, G, H, I, J, K, L, N, M, R are physically distant from node A thus failing the minimum RSS threshold requirement, the shortest path algorithm/ formula can exclude these nodes as a parent node for node A. Between node B and node E, a distance of the route 265 (A-E-R) to the root node R is shorter than a distance of the route 267 (A-B-R) and a distance of the route 269 (A-B-E-R), such that the shortest path algorithm/formula can exclude node B as a parent node for node A. By analogy, the shortest path algorithm/formula can determine the connections of the nodes within the cluster. FIG. 2E is a diagram illustrating an example address distribution wave 280 of a logical address distribution protocol for clustering beacons, according to one embodiment. For instance, the address distribution wave 280 can start from parent nodes going downwards to child nodes in a tree structure to distribute logical/routing addresses. In one embodiment, logical addresses are integers starting from 0 up to an implementation-specific size. By way of example, the root beacon's physical address (e.g., MAC address) can be used as the cluster's unique ID based on which the nodes can filter ambient packets.

In FIG. 2E, starting from the root node R, the address distribution wave 280 can allocate a contiguous range of logical/routing addresses starting from 0 up to the total cumulative load count that the root node received. The range is divided on the root node's children (e.g., nodes E, I, N) based on each child's reported load. A weighted distance to root (WDR) of the root node is set to 0. On a first broadcast interval of the address distribution wave 280, the root node R broadcasts an address distribution packet (e.g., a packet 281) to its children their corresponding allocation ranges and weighted distances to root (WDRs). In one embodiment, the address distribution packet in FIG. 2E broadcasted by a parent node can cover all child node(s), such that the ranges of the child nodes are transmitted via one packet. As such, the address distribution packet 281 in FIG. 2E from a parent node to a child node has a wider coverage than the load collection packet 261 in FIG. 2D from a child node to a parent node.

Upon receiving the address distribution packet, each child node (e.g., nodes E, I, N) can pick up its portion of the logical address allocation range, split its allocation range again over its own children based on their loads, and calculate its own WDR by augmenting (e.g., based on a formula defined below) a parent WDR with RSS of the address distribution packet as received. On the next broadcast interval of each child, its children allocations and WDR are broadcasted via another address distribution packet (e.g., a packet 283). The process repeats until reaching leaf nodes (e.g., nodes A, B, C, D, F, G, H, J, K, L, M), where no more children left to split the allocation over.

Taking drone delivery as an example application, the system 100 can provide guidance to a destination/target node (e.g., node D) via logical addresses, where the nodes in FIG. 2E hold information about routing through the lowest cost next node(s) (e.g., node B). Starting from the root node R, routing information to next hops (nodes) are picked up at subsequent node (e.g., node B) for reaching the destination logical address through the least weighted distance route (LWDR). Whenever the cluster constellation changes (e.g., due to one or more load collection parameter changes), logical addresses are re-allocated and distributed among the entire cluster nodes through the logical address distribution protocol.

In one embodiment, the UEs 103 contain sensors 105a-105n (collectively referred to as sensors 105 of different types that sense different characteristics) and applications 107a-107n (collectively referred to as applications 107, such as mapping/location-based application). In one embodiment, the system 100 can process sensor data collected by transceivers and/or sensors of the beacons 102, the UEs 103, etc., to determine a status of at least one of the beacons 102 and/or the UEs 103 as being: (1) a root node/gateway beacon, (2) a parent node/beacon, (3) a child node/beacon, (4) a leaf node/beacon, etc., as well as a weighted distance to root (WDR) for each node/beacon.

In another embodiment, the system 100 can apply the WDRs to a locate a least weighted distance route (LWDR) to guide a drone to a target beacon (e.g., a UE 103) from a gateway beacon via one or more parent nodes for indoor package delivery, pick-up, survey, etc. In yet another embodiment, the system 100 can apply the same approach to outdoor beacon mapping, navigation, and package delivery, pick-up, survey, etc. In yet another embodiment, the system 100 can apply the same approach to present navigation instructions via a user interface of UE 103, to guide a user to perform a package delivery, pick-up, survey, etc.

In one embodiment, the system 100 can detect dynamic changes in locations and/or orientations of one or more network-connected and/or clustered beacons 102 and/or UEs 103 (e.g., mobile phones, cellphones, smart watches, drones, glasses, dashboard cameras, photo/video cameras, computer vision enabled cameras, etc.) in an area and modify/update the logical address distribution(s) and/or cluster(s) accordingly, such as adding or deleting one or more child/leaf nodes, adding or deleting one or more parent nodes, adding or deleting one or more root nodes, etc., due to node movements, signal strength changes (e.g., out of power), signal orientation changes, etc.

As shown in FIG. 1, the UEs 103 are connected to a mapping platform 109 (that includes a machine learning system 111, and is connected to the domain database 202 and a geographic database 113), via a communication network 115. The UEs 103 also have connectivity to a service platform 117 that includes one or more services 119a-119m (also collectivity referred to as services 119) for providing mapping and/or location-based services. In one embodiment, the service platform 117 and/or services 119 interact with one or more content providers 121a-121j (also collectively referred to as content providers 121) to provide mapping information or user generated content information to the mapping platform 109.

In one embodiment, the mapping platform 109 can performs the functions of dynamic beacons address allocation and drone delivery using beacon positioning as discussed with respect to the various embodiments described herein. By way of example, the mapping platform 109 may exist independently or jointly in a server, the drone 101, in one or more beacons 102, in one or more UEs 103, a cloud computing and/or cloud storage platform, one or more cloud edge computing devices, etc. Further, in one example, a user may use a UE 103 in order to both communicate map-related information within the services 119 (e.g., social network services) as well as receive the traffic and/or POI data generated by the mapping platform 109 and stored in the geographic database 113.

Figure 3:
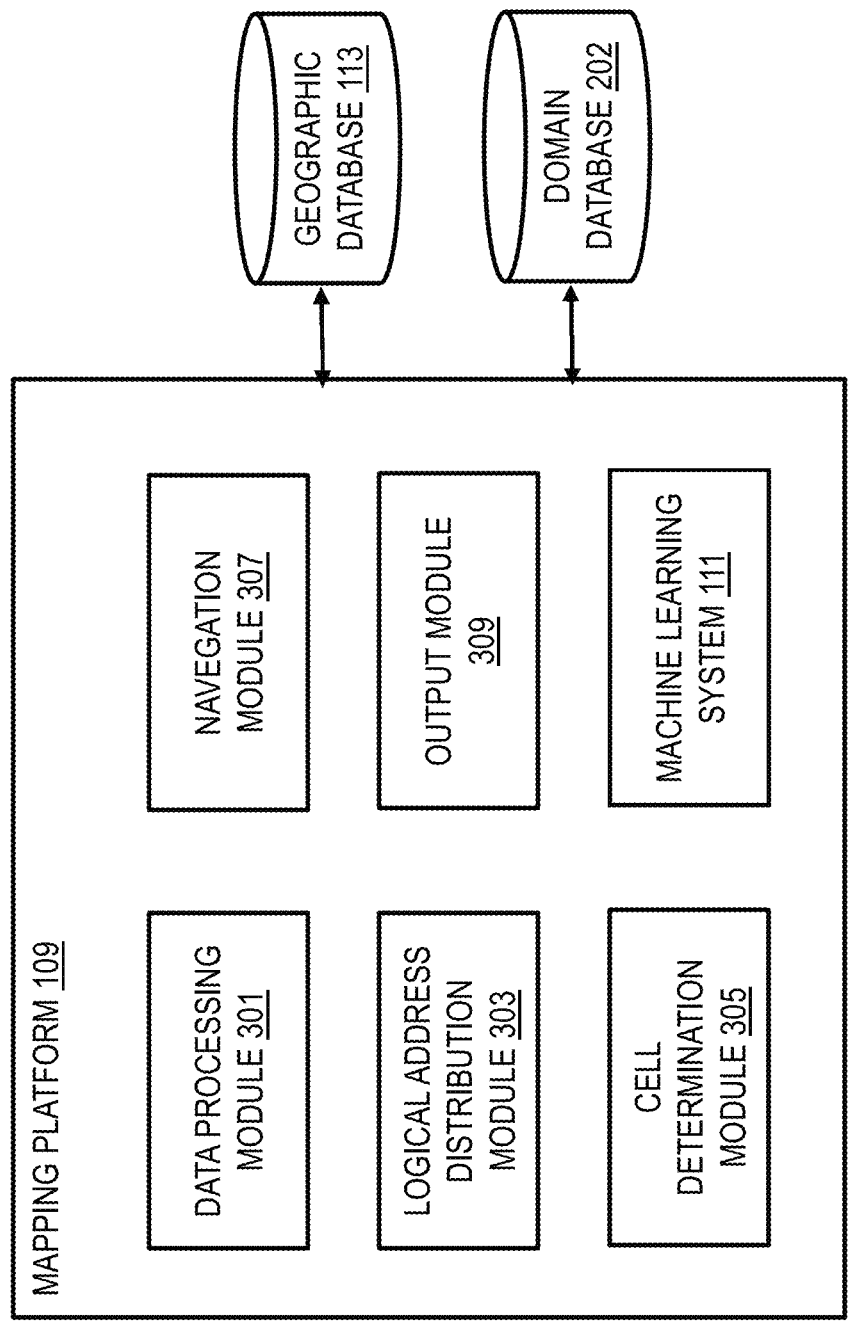
FIG. 3 is a diagram of components of a mapping platform, according to one embodiment.

FIG. 3 is a diagram of the components of a mapping platform configured to dynamically allocate logical addresses to beacons and to support drone delivery using beacon positioning, according to one embodiment. By way of example, the mapping platform 109 includes one or more components for dynamic beacons address allocation and drone delivery using beacon positioning, according to the various embodiments described herein. It is contemplated that the functions of these components may be combined or performed by other components of equivalent functionality.

In one embodiment, the mapping platform 109 includes an data processing module 301, a logical addresses distribution module 303, a cell determination module 305, a navigation module 307, an output module 309, and a machine learning system 111, and has connectivity to the geographic database 113 and/or the domain database 202. The above presented modules and components of the mapping platform 109 can be implemented in hardware, firmware, software, or a combination thereof. Though depicted as a separate entity in FIG. 1, it is contemplated that the mapping platform 109 may be implemented as a module of any other component of the system 100. In another embodiment, the mapping platform 109 and/or the modules 301-309 may be implemented as a cloud-based service, local service, native application, or combination thereof. The functions of the mapping platform 109, the machine learning system 111, and/or the modules 301-309 are discussed with respect to FIGS. 4-9.

Figure 4:
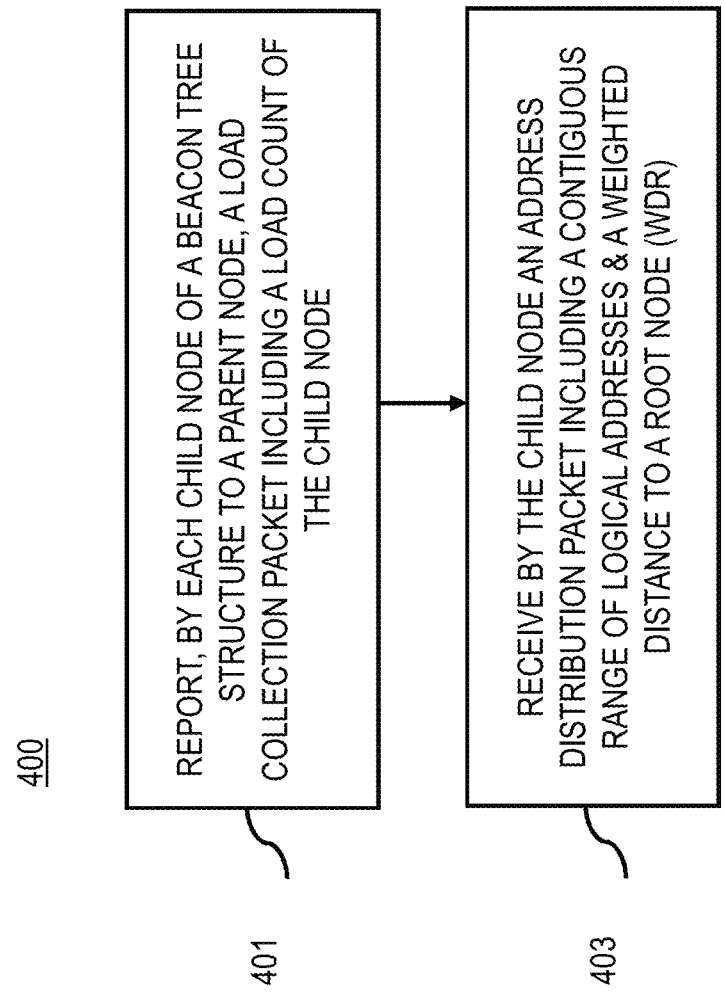
FIG. 4 is a flowchart of a process for dynamic beacons address allocation, according to one embodiment.
Figure 12:
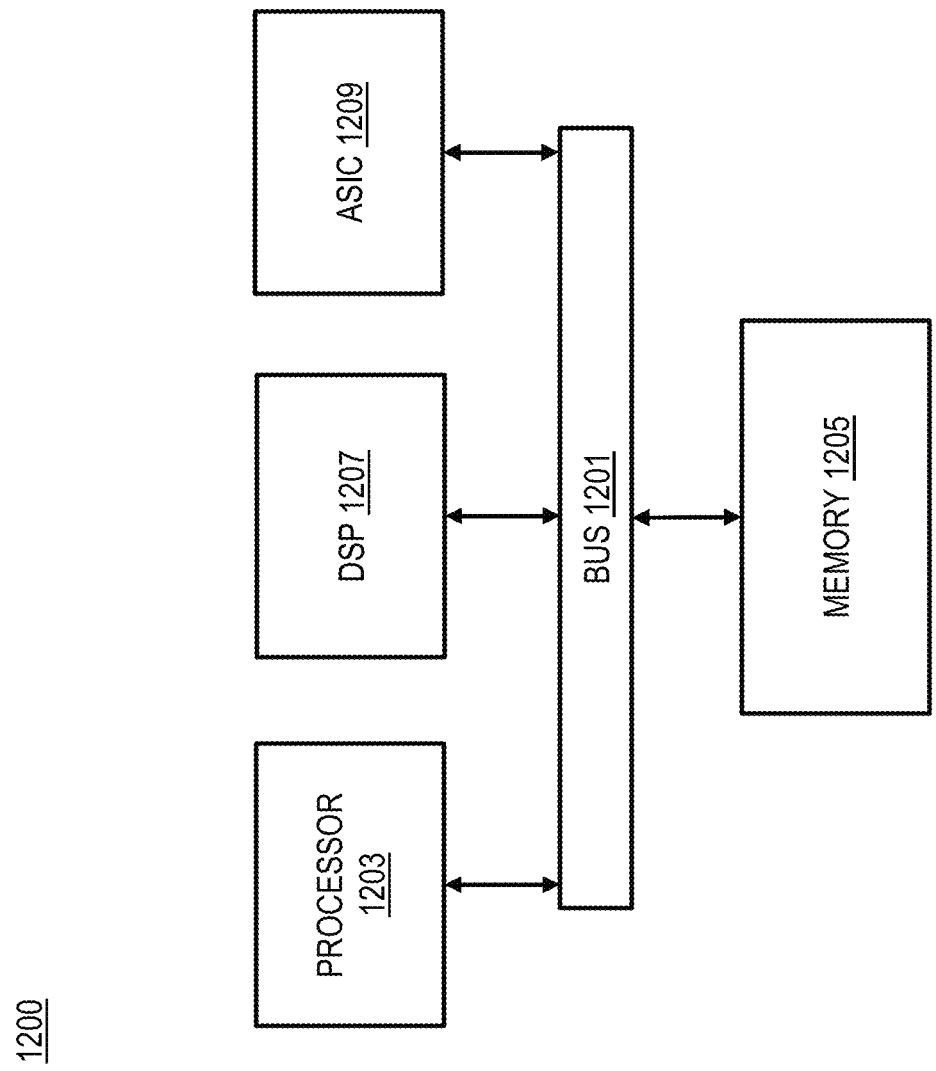
FIG. 12 is a diagram of a chip set that can be used to implement an embodiment.

FIG. 4 is a flowchart of a process for dynamic beacons address allocation, according to one embodiment. In various embodiments, the mapping platform 109, the machine learning system 111, and/or any of the modules 301-309 may perform one or more portions of the process 400 and may be implemented in, for instance, a chip set including a processor and a memory as shown in FIG. 12. As such, the mapping platform 109, the machine learning system 111, and/or the modules 301-309 can provide means for accomplishing various parts of the process 400, as well as means for accomplishing embodiments of other processes described herein in conjunction with other components of the system 100. Although the process 400 is illustrated and described as a sequence of steps, its contemplated that various embodiments of the process 400 may be performed in any order or combination and need not include all the illustrated steps.

Figure 5A:
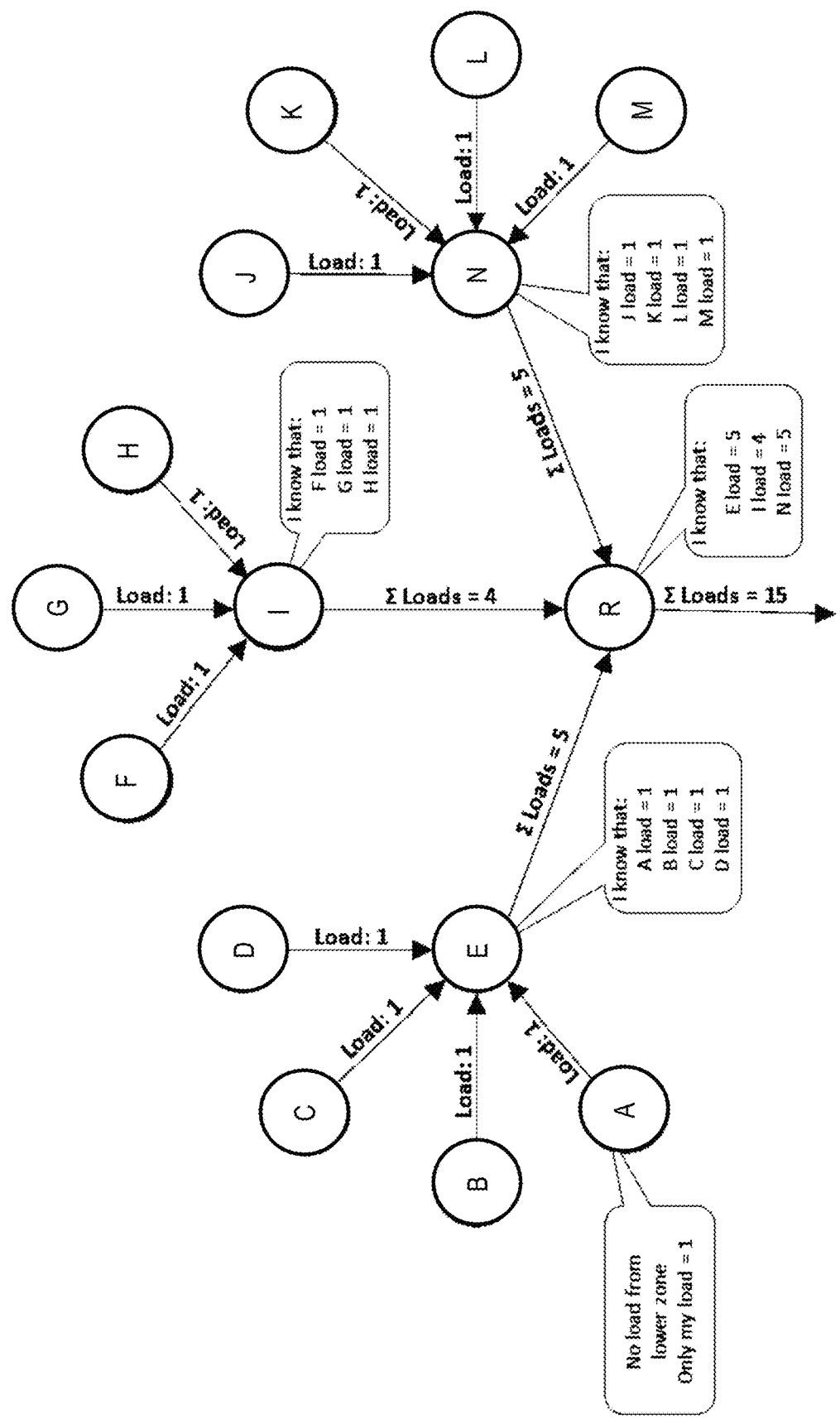
FIGS. 5A-5C are diagrams illustrating an example logical address distribution process for clustering beacons, according to various embodiments.
Figure 5B:
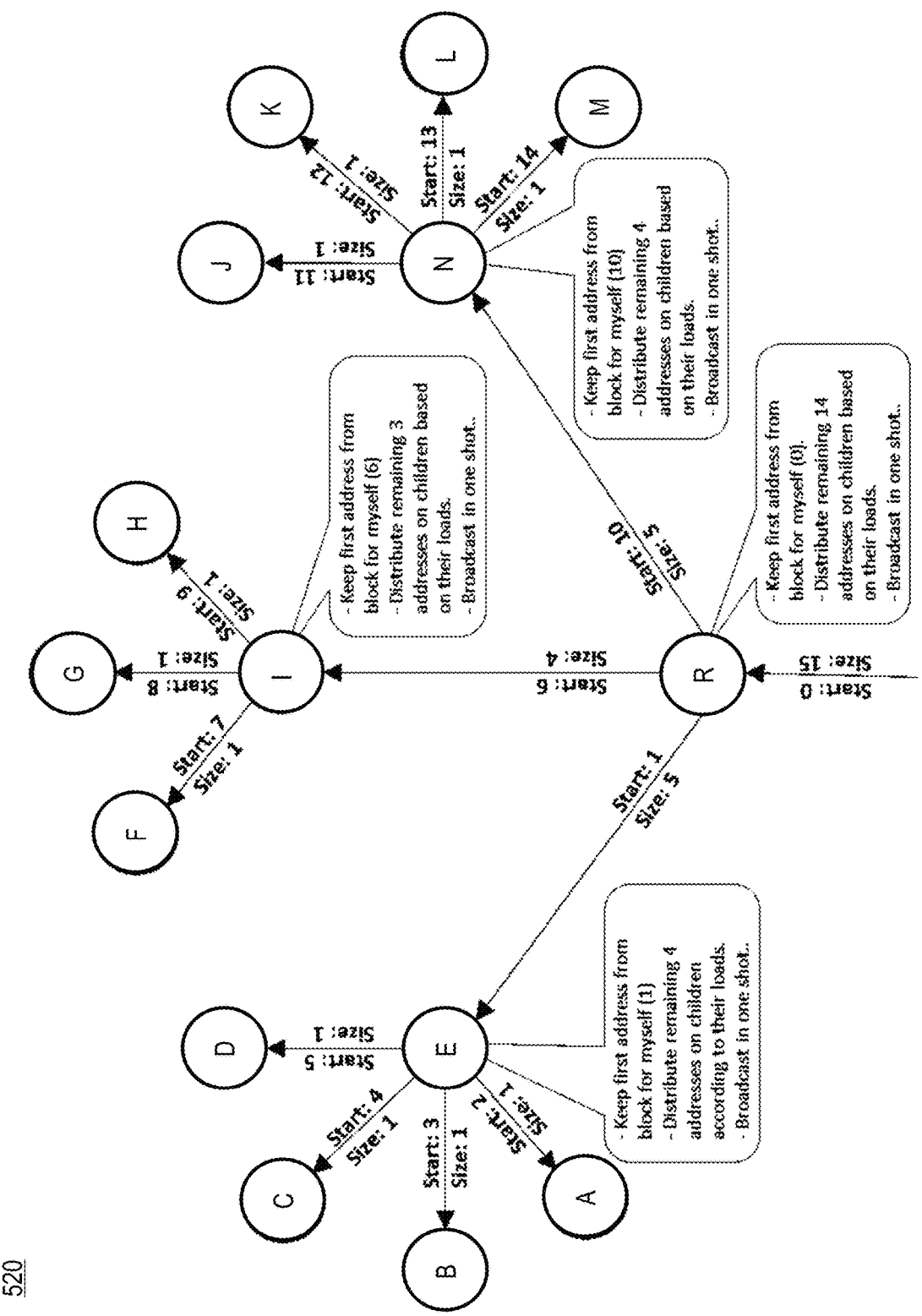
Figure 5C:
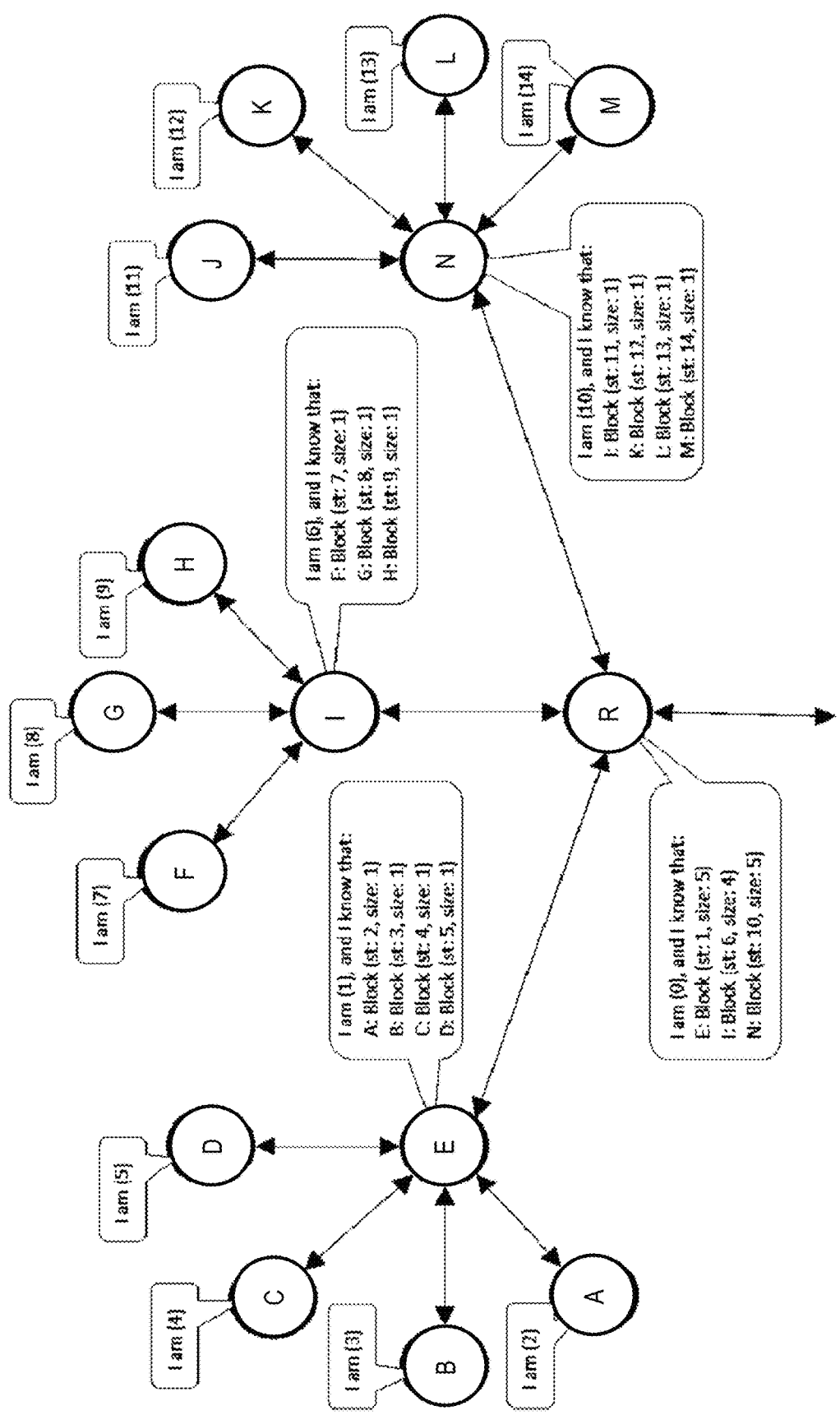

In one embodiment, the logical addresses distribution module 303 can implement a self-clustering and address-assigning scheme via a logical address distribution protocol based on radio frequency strengths perceived by the beacons, thereby automatically propagating beacon cluster(s) and assign beacon IDs ad hoc. FIGS. 5A-5C are diagrams illustrating an example logical address distribution process for clustering beacons, according to various embodiments.

For instance, in step 401, each child node of a tree structure can report to a parent node a load collection packet including a load count of the each child node. FIG. 5A is a diagram 500 illustrating an example load collection wave of the logical address distribution process for clustering beacons with information flowing from lower-to-upper zones, according to one embodiment. For instance, each node associated via the tree structure can be a beacon. The each child node can be either a leaf node (e.g., nodes A, B, C, D, F, G, H, J, K, L, M) without any other nodes reporting thereto, or a parent node (e.g., nodes E, I, N, R) with one or more other nodes reporting thereto. The parent node can be either a root node (e.g., node R) without reporting to any other nodes in the tree structure, or a child node (e.g., nodes E, I, N) reporting to another node (e.g., node R) in the tree structure. While the parent node (e.g., node E) can be located on a shortest path from a leaf node (e.g., node D) to the root node (e.g., node R) measured based at least on beacon signal strengths, and the load count is a total number (e.g., 5=4+1) of the one or more other nodes reporting to the parent node (e.g., node E) plus one.

For instance, each child node (e.g., nodes A, B, C, D, F, G, H, J, K, L, M) reporting its load count (i.e., no load from a lower zone but its own load=1) upwards to a parent node (e.g., nodes E, I, N) using, for example, a load collection packet during a first broadcast interval of the load collection wave. Each parent node (e.g., node E) can sum the reported loads (e.g., nodes A, D, C, D=4) and summates its total load count (e.g., 4+E itself=5). As another example, a parent node (e.g., node I) can receive from each child node (e.g., nodes F, G, H=3) of the parent node, a load collection packet including a load count of the each child node, and sum the reported loads (e.g., nodes F, G, H=3) plus one as its total load count (e.g., 3+1=4). As another example, a parent node (e.g., node N) can receive from each child node (e.g., nodes J, K, L, M=4) of the parent node, a load collection packet including a load count of the each child node, and sum the reported loads (e.g., nodes J, K, L, M=4) plus one as its total load count (e.g., 4+1=5).

In one embodiment, the root note can summate the load count directly reported by one or more parent nodes in the tree structure into a total number of nodes in the tree structure which is a total number of logical address in the tree structure. During the next broadcast interval of the load collection wave, the root node (e.g., node R) can receive from each child node (e.g., nodes E, I, N) of the root node, a load collection packet including a load count of the each child node, and sum the reported loads (e.g., node E load 5, node I load 4, node N load 5) plus one as its total load count (e.g., 5+4+5+1=15).

FIGS. 5B-5C are diagrams illustrating an example address distribution wave of a logical address distribution process for clustering beacons, according to one embodiment. For instance, the address distribution wave can start from parent nodes going downwards to child nodes in a tree structure to distribute logical/routing addresses.

In one embodiment, the root note can divide the total number of logical address per parent node directly reporting to the root node based the load count directly reported therefrom, allocate a primary contiguous range of the logical addresses per directly reporting parent node based on the division, and assign a weighted distance to the root node from a directly reporting parent node based on the contiguous range. In a diagram 520 of FIG. 5B, starting from the root node R, the address distribution wave can allocate a contiguous range of logical/routing addresses starting from 0 up to the total cumulative load count (e.g., 14) that the root node received. The range of 14 is divided among the root node's children (e.g., nodes E, I, N) based on each child's reported load. For instance, node E has a load 5, so its range being 1-5, i.e., starting from 1 with a size of 5. As another instance, node I has a load 4 so its range being 6-9, i.e., starting from 6 with a size of 4. As another instance, node N has a load 5 so its range being 10-14, i.e., starting from 10 with a size of 5.

For instance, the root note can broadcast to each directly reporting parent node the address distribution packet that includes the primary contiguous range of the logical addresses and a respective weighted distance to the root node, and each directly reporting parent node can take from the address distribution packet the primary contiguous range of the logical addresses and the respective weighted distance to the root node. The root node R can broadcast an address distribution packet to its child nodes (e.g., nodes E, I, N) in one shot, and the address distribution packet including the children's corresponding allocation ranges and weighted distances to root (WDRs).

In addition, each directly reporting parent node can divide the primary contiguous range of the logical addresses among one or more child nodes reporting to the directly reporting parent node into a secondary contiguous range of the logical addresses, and calculate a weighted distance to the root node from each of the one or more child nodes by augmenting the respective weighted distance to the root node from the each directly reporting parent node with a received signal strength of the address distribution packet. In one embodiment, the each directly reporting parent node can broadcast to each directly reporting child node an address distribution packet that includes the secondary contiguous range of the logical addresses and the weighted distance to the root node from the each directly reporting child node. For instance, on a second broadcast interval of the address distribution wave, each of the nodes E, I, N broadcasts an address distribution packet to its children their corresponding allocation ranges and WDRs. For example, node E can keep a first address from block for itself (1), distribute remaining four addresses to its children (e.g., nodes A, D, C, D) according to their loads, and broadcast an address distribution packet to its child nodes (e.g., nodes A, D, C, D=4) in one shot. For instance, each of the nodes A, D, C, D has a load 1, so its range/size being 1, i.e., starting from WDR of its parent or a predecessor. For instance, node A has a load 1, so its range being 2-2, i.e., starting from 2 with a size of 1. As another instance, node B has a load 1 so its range being 3-3, i.e., starting from 3 with a size of 1. As another example, node I can keep a first address from block for itself (6), distribute remaining four addresses to its children (e.g., nodes F, G, H) according to their loads, and broadcast an address distribution packet to its child nodes (e.g., nodes F, G, H=3) in one shot. For instance, node F has a load 1, so its range being 7-7, i.e., starting from 7 with a size of 1. As another instance, node G has a load 1 so its range being 8-8, i.e., starting from 6 with a size of 1. As another example, node N can keep a first address from block for itself (10), distribute remaining four addresses to its children (e.g., nodes J, K, L, M) according to their loads, and broadcast an address distribution packet to its child nodes (e.g., nodes J, K, L, M=4) in one shot. For instance, node J has a load 1, so its range being 11-11, i.e., starting from 11 with a size of 1. As another instance, node K has a load 1 so its range being 12-12, i.e., starting from 12 with a size of 1.

In a diagram 540 of FIG. 5C, the logical addresses distribution module 303 can completely distribute logical addresses as follows. A weighted distance to root (WDR) of the root node R is set to 0, and the root node R can be stored with the starting WDR and range information of child nodes as: node E: Block (st: 1, size: 5), node I: Block (st: 6, size: 4), and node N: Block (st: 10, size: 5). A WDR of the node E is set to 1, and the node E can be stored with the starting WDR and range information of child nodes as: node A: Block (st: 2, size: 1), node B: Block (st: 3, size: 1), node C: Block (st: 4, size: 1), and node D: Block (st: 5, size: 1). A WDR of the node I is set to 6, and the node I can be stored with the starting WDR and range information of child nodes as: node F: Block (st: 7, size: 1), node G: Block (st: 8, size: 1), and node H: Block (st: 9, size: 1). A WDR of the node N is set to 10, and the node N can be stored with the starting WDR and range information of child nodes as: node J: Block (st: 11, size: 1), node K: Block (st: 12, size: 1), node L: Block (st: 13, size: 1), and node M: Block (st: 14, size: 1). Each child node (e.g., nodes A, B, C, D, F, G, H, J, K, L, M) can store its own WDR.

In step 403, the each child node can receive from the parent node an address distribution packet that includes a contiguous range of logical addresses and a weighted distance to the root node. In one embodiment, one of the one or more child nodes can determine that the one child node is a leaf node based on that the secondary contiguous range is one. In another embodiment, one of the one or more child nodes can determine that the one child node is not a leaf node based on that the secondary contiguous range is more than one, and the one child node can divide the secondary contiguous range of the logical addresses over one or more child nodes directly reported thereto based on a respective load count.

In another embodiment, from the perspective of a parent node, a parent node (e.g., node I) can receive from each child node (e.g., nodes F, G, H=3) of the parent node, a load collection packet including a load count of the each child node, and transmit from the parent node to the each child node, an address distribution packet that includes a contiguous range of logical addresses and a weighted distance to the root node. Each parent node can summate the load count directly reported by the each child node of the parent node into a total number of nodes in the tree structure which is a total number of logical address in the tree structure. Each parent node can divide the total number of logical address per the each child node of the parent node based the load count directly reported therefrom, allocate a primary contiguous range of the logical addresses per the each child node of the parent node based on the division, and assign a weighted distance to the root node from the each child node of the parent node based on the contiguous range.

In one embodiment, the weighted distance of the each child node to the root node, the tree structure, or a combination thereof are provided as an input for package delivery, pick-up, survey, etc., for example, as depicted in FIG. 2B. In another embodiment, the output module 309 can send the weighted distance of the each child node to the root node, the tree structure, or a combination thereof to a database (e.g., the domain database 202) to be stored therein.

From the perspective of a root node, in one embodiment, the root node of a tree structure can receive from each child node of the root node a load collection packet including a load count of the each child node. For instance, each node associated via the tree structure can be a beacon. The each child node is either a leaf node without any other nodes reporting thereto or a parent node with one or more other nodes reporting thereto. The parent node is either the root node without reporting to any other nodes in the tree structure or a child node reporting to another node in the tree structure, and the parent node is located on a shortest path from a leaf node to the root node measured based at least on beacon signal strengths, and the load count is a total number of the one or more other nodes reporting to the parent node plus one. The root node can transmit to the each child node an address distribution packet that includes a contiguous range of logical addresses and a weighted distance to the root node, and provide the weighted distance of the each child node to the root node, the tree structure, or a combination thereof as an input for a drone navigation task. In one embodiment, the root node can summate the load count directly reported by the each child node of the root node into a total number of nodes in the tree structure which is a total number of logical address in the tree structure. In addition, the root node can divide the total number of logical address per the each child node of the root node based the load count directly reported therefrom, allocate a primary contiguous range of the logical addresses per the each child node of the root node based on the division, and assign a weighted distance to the root node from the each child node of the root node based on the contiguous range.

From the perspective of a parent node, in one embodiment, a parent node of a tree structure can receive from each child node of the parent node a load collection packet including a load count of the each child node. For instance, each node associated via the tree structure can be a beacon. The each child node is either a leaf node without any other nodes reporting thereto or a parent node with one or more other nodes reporting thereto, and the parent node is either a root node of the tree structure without reporting to any other nodes in the tree structure or a child node reporting to another node in the tree structure, and the parent node is located on a shortest path from a leaf node to the root node measured based at least on beacon signal strengths, and the load count is a total number of the one or more other nodes reporting to the parent node plus one. The parent node can transmit to the each child node an address distribution packet that includes a contiguous range of logical addresses and a weighted distance to the root node. In one embodiment, the weighted distance of the each child node to the root node, the tree structure, or a combination thereof can be provided as an input for a drone navigation task.

In one embodiment, the parent node can summate the load count directly reported by the each child node of the parent node into a total number of nodes in the tree structure which is a total number of logical address in the tree structure. In addition, the parent node can divide the total number of logical address per the each child node of the parent node based the load count directly reported therefrom, allocate a primary contiguous range of the logical addresses per the each child node of the parent node based on the division, and assign a weighted distance to the root node from the each child node of the parent node based on the contiguous range.

Figure 6:
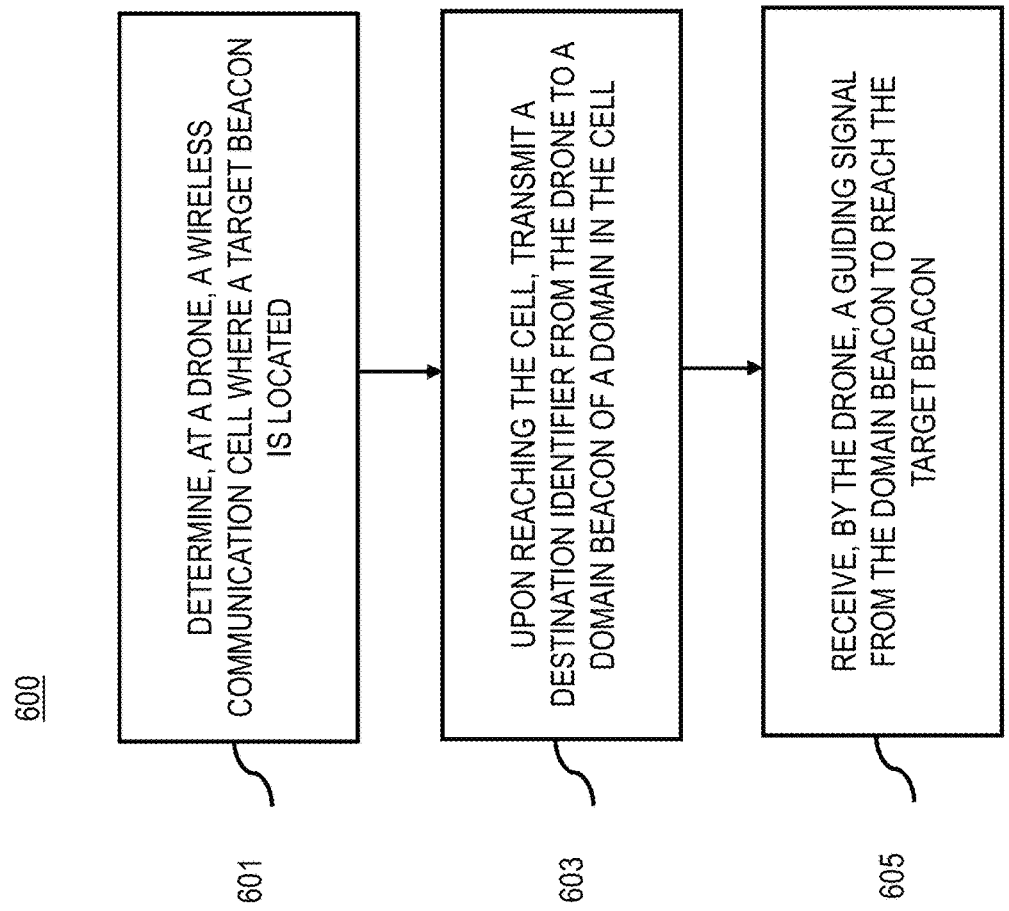
FIG. 6 is a flowchart of a process for drone delivery using beacon positioning, according to one embodiment.

FIG. 6 is a flowchart of a process for drone delivery using beacon positioning, according to one embodiment. In various embodiments, the mapping platform 109, the machine learning system 111, and/or any of the modules 301-309 may perform one or more portions of the process 600 and may be implemented independently or jointly, for instance, via a chip set including a processor and a memory as shown in FIG. 12, a server, the drone 101, in one or more beacons 102, in one or more UEs 103, a cloud computing and/or cloud storage platform, one or more cloud edge computing devices, etc.

As such, the mapping platform 109, the machine learning system 111, and/or the modules 301-309 can provide means for accomplishing various parts of the process 600, as well as means for accomplishing embodiments of other processes described herein in conjunction with other components of the system 100. Although the process 600 is illustrated and described as a sequence of steps, its contemplated that various embodiments of the process 600 may be performed in any order or combination and need not include all the illustrated steps.

In one embodiment, in step 601, the cell determination module 305 can determine at a drone (e.g., the drone 101 in FIG. 2B) a cell (e.g., the Cell 104) where a target beacon (e.g., UE 103) associated with a domain (e.g., with a domain address 3F64.YF3U) is located.

In one embodiment, the cell determination module 305 can determine a cell identifier associated with the target beacon (e.g., UE 103) based on a navigation task (e.g., to a destination for a delivery, pick-up, survey, etc.) assigned to the drone 101. For instance, the cell identifier can be associated to a street address, a coordinate pair, a What3Words® address, or any other location referencing scheme, and the navigation task can include an identifier of the target beacon (e.g., a MAC address) and/or a direct or indirect reference to the cell identifier.

The cell (e.g., the cell 104), the domain address (e.g., 3F64.YF3U), or a combination thereof can be determined based on the cell identifier. For instance, the drone 101 can navigate to the cell (e.g., the cell 104) based on an identifier of the cell. By way of examples, the domain address of the domain beacon can be a network address (e.g., an IP address, a MAC address, other broadcast addresses).

Taking FIG. 5C as an example, the drone 101 has a navigation task to get to beacon D based on a street address (e.g., 123 Street ABC) and a MAC address (e.g., x:y:z) of the UE 103. Optionally, the navigation task can include of the current domain of the UE 103, when tree networks are set as task-specific and not mix with one another. After matching the street address with a cell ID, the drone 101 flies to the cell 104, looks for a root node R (e.g. the gateway 221 with Domain 3F64.YF3U in FIG. 2B) in the cell 104. The drone 101 may need to move in some pattern around in the cell 104 to find the root node R. The drone 101 can request the root node R for the logical address corresponding to the target node (e.g., UE 103) with the MAC address (e.g., x:y:z). The root node R then asks its tree network, for a node with MAC x:y:z, the corresponding node D replies with its logical address (5) via the intermediate node E (with a logical address (1)) to the root node R (with a logical address (0)). The root node R then gives the MAC address of the intermediate node E, and/or the logical address (1) in the tree graph to the drone 101, the drone 101 flies to the intermediate node E based on its MAC address and/or the logical address (1) in the tree graph. When the drone 101 reaches the intermediate node E, the intermediate node E gives the MAC address of the target node D, and/or the logical address (5) in the tree graph to the drone 101, the drone 101 flies to the target node D based on its MAC address and/or the logical address (5) in the tree graph.

In another embodiment, the beacons are connected and "intelligent" to have knowledge of a navigation task ID (e.g. a parcel ID, order Nr., etc.). When the drone 101 approaches the root node R, the drone 101 can ask the root node R "which node has Order Nr.?", the root node R can broadcast the question to its tree network, to which the target beacon/node D will answer: "me—3F64.YF3U.0005." Alternatively, the root node R may also have access to Order Nr.—beacon ID mapping, and provide the information to the drone 101.

In another embodiment, the cell can be a wireless communication cell. In such scenario, a more dynamic cell ID mechanism (than the geographic partition scheme) is required. For instance, there can be a key-value structure which identifies the wireless communication cell. Furthermore, the navigation task can include a cellular number in addition to some basic information such as recipient name and address. This cellular number can be used to locate a wireless communication cell ID for the drone 101 to move and then navigate from beacon/node to beacon/node as in the case of a geographically partitioned cell. This scenario can require a cell network provider to provide an associated base station ID (i.e., a wireless communication cell ID) associated with the cellular number of the target beacon (e.g., UE 103). Under this scenario, the cell network provider may send a message to the UE 103 associated with the cellular number to query whether the user will remain at the location for a predetermined time period long enough to accommodate the drone navigation task. With a positive response, the cell network provider then provide the associated base station ID to the drone 101.

In one embodiment, upon reaching the cell in step 603, the navigation module 307 can transmit a destination identifier (e.g., a MAC address, a recipient name/address/contact number, an order number, etc.) associated with the target beacon (e.g., UE 103) from the drone to a domain beacon (e.g., the domain beacon 221 in FIG. 2B, the root node R in FIG. 5C, etc.) of the domain in the cell.

In one embodiment, in step 605, the navigation module 307 (e.g., in the drone 101) can receive a guiding signal from the domain beacon to reach the target beacon. The guiding signal can include a domain address, a sub-address, or a combination thereof. For instance, the guiding signal can include a sub-address of an intermediate beacon (e.g., 3F64.YF3U.0001) or a sub-address of a target beacon that is directed connected to the domain beacon. The sub-address can be a logical address (e.g., a routing address, a weighted distance to a root node (WDR), etc.).

In another embodiment, the drone 101 can receive from the domain beacon (e.g., the domain beacon 221 in FIG. 2B) one or more subsequent guiding signals from one or more intermediate beacons (e.g., the beacons 223, 225) on the lowest cost path to the target beacon (e.g., UE 103). By way of example, such lowest cost path can be the shortest path, the least weighted distance to a root node (LWDR), etc. that is determined based on a received signal strength (RSS), a number of hops, physical distances between nodes, etc. For instance, the beacons can directly measure the received signal strength (RSS) and the number of hops, while the physical distances between nodes can be inferred/derived from RSS, or simply specified by users. In this embodiment, the drone can be further guided by the one or more intermediate beacons (e.g., the beacons 223, 225) based one or more logical addresses of the one or more intermediate beacons (e.g., the beacons 223, 225). For instance, the domain beacon can be a wireless communication gateway (e.g., Wi-Fi/LiFi access points, Bluetooth beacons, Ultra-Wideband beacons, etc.), and the target beacon can be a mobile device.

In one embodiment, the tree network and/or the root node can have the authority to pause the logical address distribution protocol, for example, to have the beacons/nodes to stick to their logical addresses for a period of time to allow for the drone 101 on an active navigation task to navigate the tree network (without the beacon addresses changing while the task is in progress). For instance, the root node can initiate a pause of the load collection packet and the address distribution packet in response to an ongoing drone navigation task associated with the tree structure, by setting either a timeout period for the pause, or waiting for a confirmation that the drone 101 has completed the navigation task.

In another embodiment, an intermediate node or a target node can stop reporting its MAC address within its load collection packets after its successful communication with the drone 101 once the drone 101 reaching that intermediate/target node. As such, the root node will stop receiving the load collection packets and/or continuous address resolution replies (reporting the MAC address) from that intermediate/target node, and hence the root node can resume address distribution packets. This allows for the rest of the tree network to reconfigure while maintaining the logical addresses for those nodes involved in the navigation of the drone 101.

In one embodiment, the domain beacon (e.g., the domain beacon 221) communicates with the first intermediate beacon (e.g., the beacon 223) through multicast, and the target beacon (e.g., UE 103) communicates with a last one of the one or more intermediate beacons (e.g., the beacon 225) through unicast. For instance, the guiding signal from the domain beacon (e.g., the domain beacon 221) to a first one of the one or more intermediate beacons (e.g., the beacon 223) can be a radio signal, and the guiding signal directly to the target beacon (e.g., UE 103) can be an infrared signal. In other instances, the drone 101 can follow a radio signal specified for the UE 103 until the respective received signal strength reaches a maximum value, or the drone 101 can use optical means to scan/recognize a code, a logo (e.g., of the delivery service), a (locally) unique feature, etc. associated with the delivery and placed near or on the UE 103.

By way of examples, the target beacon (e.g., UE 103) can be located in an area (e.g., buildings, airports, alleys, parking garages, warehouse, factories, underground locations, subways, etc.) with irregular cellular reception, and the drone 101 can deliver a package to the target beacon.

Figure 7:
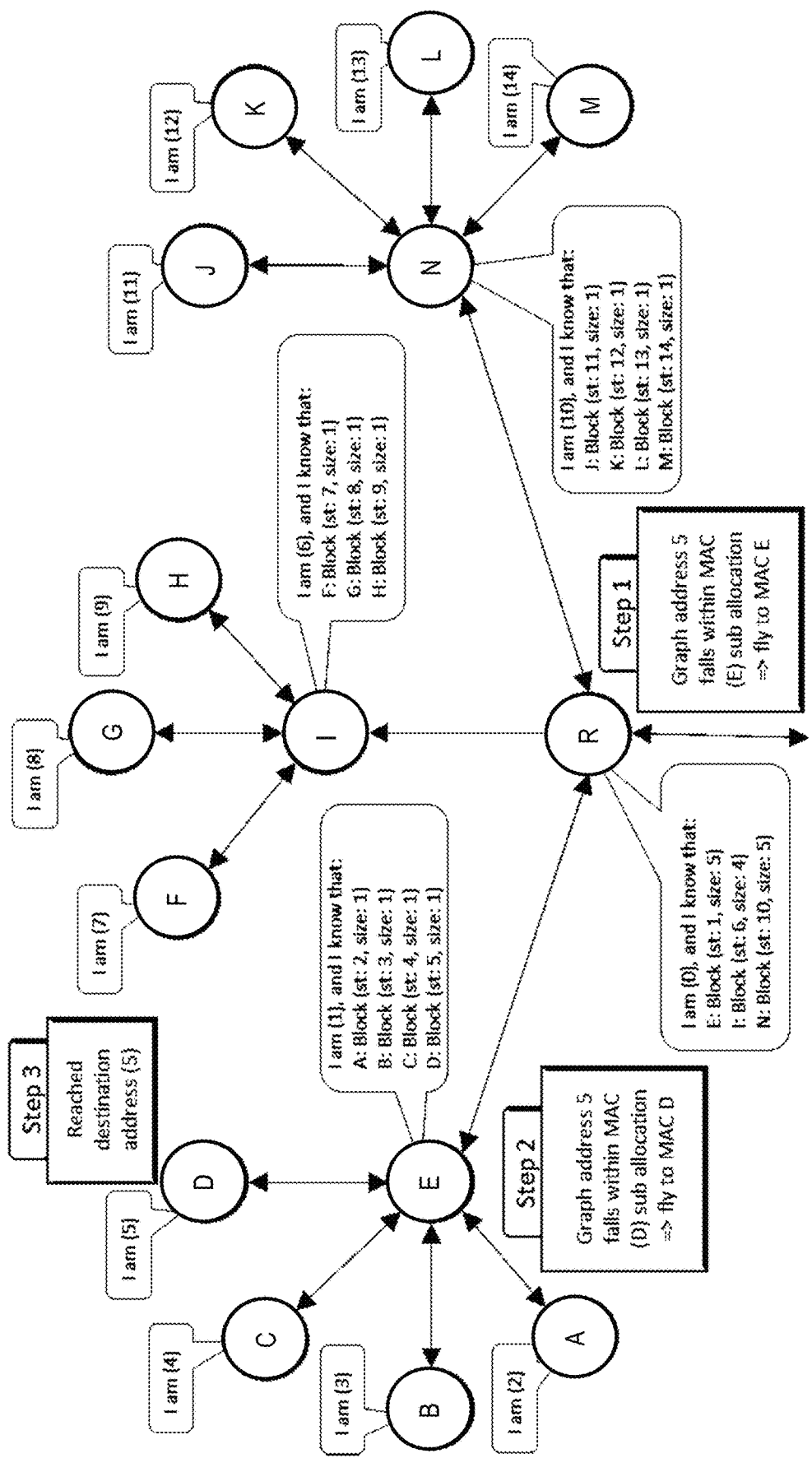
FIG. 7 is a diagram illustrating an example drone guiding process from a domain beacon to a target beacon, according to one embodiment.

FIG. 7 is a diagram 700 illustrating an example drone guiding process from a domain beacon to a target beacon, according to one embodiment. As mentioned, the root beacon R is the source node of the graph and the physical entry point to the cluster, and the root beacon's MAC address can be used as the cluster's unique ID, while logical/routing address 0 of the root node can be used to guide the drone 101. For instance, the target node D is a child node of the node E, while the node E is a child node of the root node R. After identifying the root node R based on it domain address (e.g., 3F64.YF3U), MAC address, etc., the drone 101 can communicate with the root node R with the sub-address of the target node D (e.g., 3F64.YF3U.0005), the MAC address of the node D, etc. In Step 1 in FIG. 7, the root node R can check its logical/routing address data, match the sub-address and/or MAC address of the node D as the logical address 5 of the target node D, find that the logical address 5 of the target node D falling within the logical address range of the node E, and guide the drone 101 to move to the node E using its sub-address (e.g., 3F64.YF3U.0001) and/or MAC address of the node E.

After identifying the node E based on it using its sub-address and/or MAC address, the drone 101 can communicate with the root node E with the sub-address of the target node D (e.g., 3F64.YF3U.0005), the MAC address of the node D, etc. In Step 2 in FIG. 7, the node E can check its logical/routing address data, match the sub-address and/or MAC address of the node D as the logical address 5 of the target node D, find that the logical address 5 of the target node D, and guide the drone 101 to move to the node D using line of sight (LoS) infrared to the logical address 5 (Step 3 in FIG. 7). As shown in FIG. 7, the graph nodes hold information about routing through the lowest cost next nodes. Starting from the root node, routing information to next hops (nodes) are picked up at subsequent node for reaching the destination logical address through the least Weighted Distance Route (LWDR).

Figure 8A:
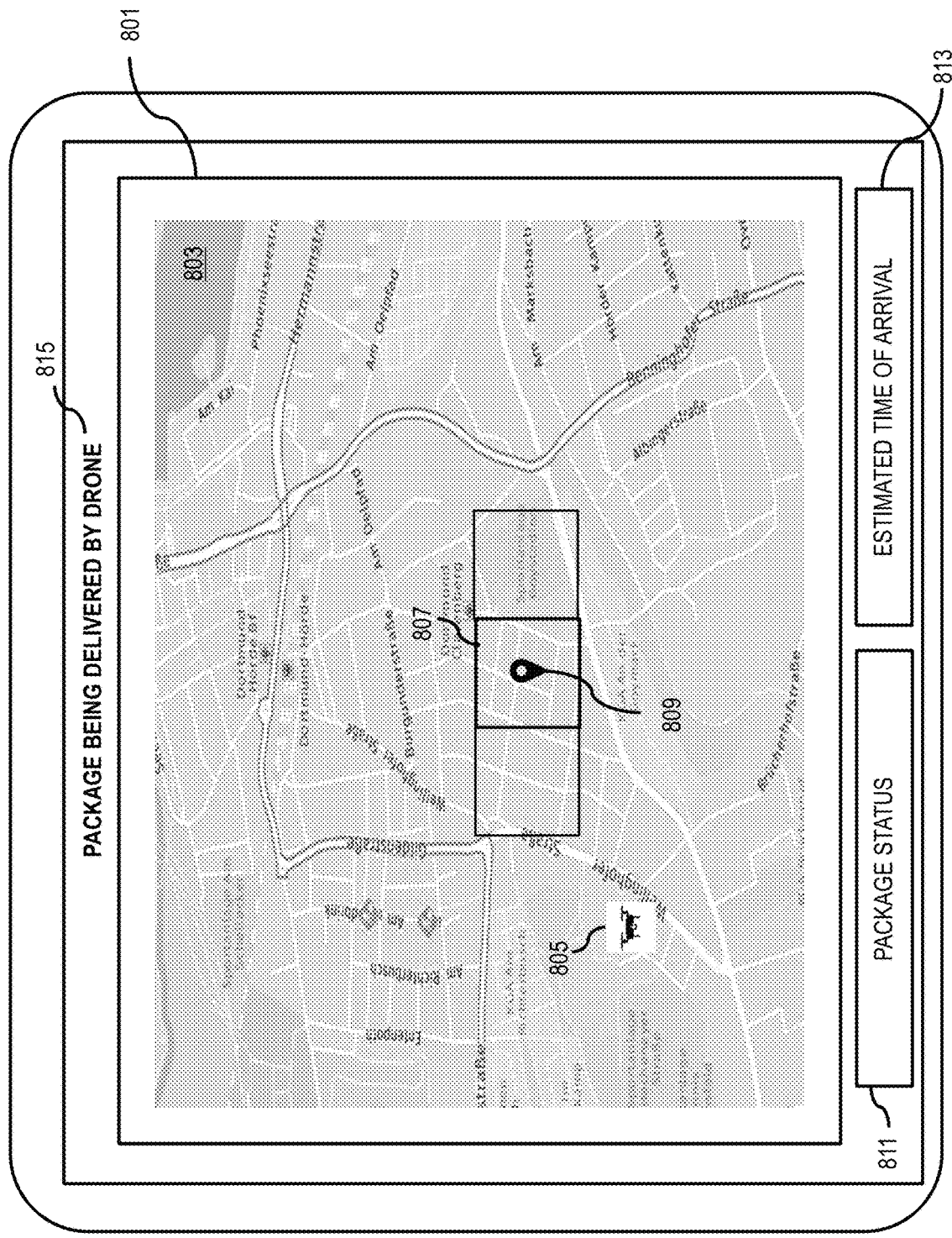
FIGS. 8A-8B are diagrams of example user interfaces for drone delivery using beacon positioning, according to various embodiments.
Figure 8B:
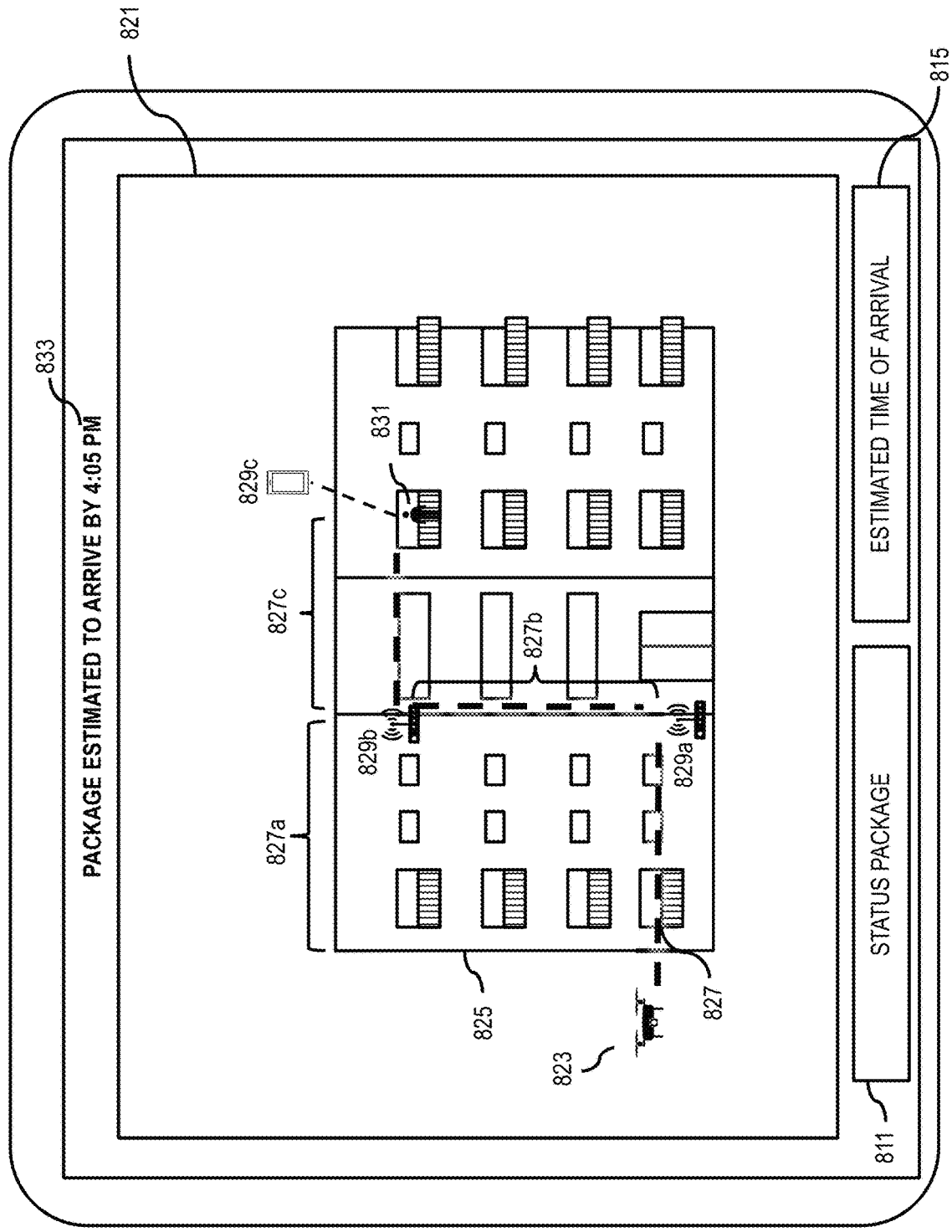

By way of example, FIGS. 8A and 8B are diagrams of example user interfaces for drone delivery using beacon positioning, according to various embodiments. Referring to FIG. 8A, in one embodiment, the system 100 can generate a user interface (UI) 801 (e.g., a navigation application 107) for a UE 103 (e.g., a mobile device, an embedded navigation system, etc.). In one instance, the system 100 can generate the UI 801 such that it includes a map 803 depicting a drone 805 travelling towards a cell 807 where a domain beacon 809 associated with a target beacon (e.g., the UE 103) is located. In this example, the system 100 can also generate the UI 801 such that it includes an input 811 (e.g., "Package Status") and an input 813 (e.g., "Estimated Time of Arrival"). For example, a user can interact with the user interface 801, the various inputs described with respect to FIGS. 8A and 8B (e.g., inputs 811 and 813), or a combination thereof via one or more physical interactions (e.g., a touch, a tap, a gesture, typing, etc.), one or more voice commands (e.g., "show where the package is now," "when will the package arrive?," etc.), or a combination thereof.

In one instance, when a user interacts with the input 811 (e.g., "Package Status"), the system 100 can generate the user interface 801 such that it shows an alert 815: "Package being delivered by a drone," as depicted in FIG. 8A. In another example, when the user interacts with the input 913 (e.g., "Estimated Time of Arrival"), the system 100 can generate the UI 821 such that it shows a drone 823 moving toward a building 825 (e.g., an apartment) wherein the target beacon (e.g., the UE 103) is located. In this example, the system 100 can also generate the UI 821 such that it includes a route 827 that leads to a target beacon (e.g., the UE 103). In particular, the drone 823 can first locate a domain beacon 829*a* via a first section 827*a* of the flying route 827. The domain beacon 829*a* can then guide the drone 823 to an intermediate beacon 829*b* via a second section 827*b* of the route 827. The intermediate beacon 829*b* can then guide the drone 823 to the target beacon 829*c* (e.g., the UE 103) carried by a user 831 via a third/last section 827*c* of the route 827. In this example, the system 100 can also generate the UI 801 such that it includes a user avatar for the user 831 of a package recipient and an alert 833: "Package estimated to arrive by 4:05 pm," as depicted in FIG. 8B. It is contemplated that in this instance, the system 100 can determine or detect one or more actions by a user (e.g., an eye gaze) and automatically confirm the interaction. This is particularly useful in the case of a user busy with something else.

For the perspective of the mapping platform 109, in one embodiment, the mapping platform 109 and/or the data processing module 301 can register domain data of a plurality of domain addresses of domain beacons located in one or more cells, match a destination identifier (e.g., a cellular number, a MAC address, etc.) associated with a target beacon (e.g., UE 103) of a navigation task with a domain address (e.g., 3F64.YF3U) of a domain beacon (e.g., the domain beacon 221 in FIG. 2B) associated with a cell (e.g., the cell 104) based on the domain data, and transmit, to an drone 101, navigation task information including the cell. For instance, the target beacon identifier can be matched based on a destination address associated with the navigation task.

In another embodiment, the mapping platform 109 and/or the data processing module 301 can store the domain data in a domain database (e.g., the domain database 202). For instance, the domain data can include the domain address (e.g., 3F64.YF3U), the cell (e.g., the cell 104), and one or more sub-addresses of other beacons (e.g., the beacons 223, 225) associated with the domain beacon. The one or more sub-addresses can include the sub-address (e.g., 3F64.YF3U.0005) of the target beacon (e.g., UE 103). By way of examples the domain beacon can be a wireless communication gateway, and at least one of the domain beacon and the target beacon is a mobile device. As mentioned, a beacon can be any device that includes one or more transceivers that send wireless signals to and receive wireless signals (e.g., radio, infrared, ultrasonic, optical, laser, or other types of signals) from other devices nearby. When the domain beacon is a mobile gateway, it can support secure communication between mobile beacons and respective backend resources typically within the cloud, a private/public network, etc.

In one embodiment, the mapping platform 109 and/or the data processing module 301 can update the domain database (e.g., the domain database 202) upon receiving one or more domain data updates of the domain address, the one or more sub-addresses, or a combination thereof (e.g., via the load collection packets and address distribution packets shown in FIGS. 2C-2E). For instance, the one or more domain data updates can be caused by movements of the domain beacon, the one or more other beacons, one or more additional beacons, or a combination thereof as depicted in FIGS. 9A-9E.

From the perspective of the domain beacon, in one embodiment, a domain beacon (e.g., the domain beacon 221 in FIG. 2B) of a domain in the cell (e.g., the cell 104) can receive from a drone (e.g., drone 101) a destination identifier associated with a target beacon of a navigation task, and transmit to the drone 101 a guiding signal to reach the target beacon (e.g., UE 103). In another embodiment, the guiding signal is from the domain beacon (e.g., the domain beacon 221) to a first one of one or more intermediate beacons (e.g., the beacons 223, 225) on the lowest cost path to the target beacon (e.g., UE 103). In yet another embodiment, the domain beacon (e.g., the domain beacon 221) can transmit domain address data of the domain in the cell (e.g., the cell 104) to a domain database (e.g., the domain database 202).

In one embodiment, the root node, the leaf node, the parent node, the each child node, or a combination thereof can listen to one or more load collection packets, one or more address distribution packets, or a combination thereof transmitted by one or more neighboring nodes to locate a new shortest path to the root node or to a new root node of another tree structure.

FIGS. 9A-9E are diagrams illustrating beacon clustering examples, according to various embodiments. Each node can constantly listen to all surrounding neighbors' broadcast packets in an attempt to find itself a better parent node, even when the parent node belonging to a different cluster. In one embodiment, a received signal strength (RSS) of the potential parent is augmented with that potential parent's WDR (e.g., a logical address value found in the packet) based on a shortest path formula to calculate the child node's new WDR to the existing root node or a new root node through that potential parent.

In one embodiment, one of the root node, the leaf node, the parent node, and the child node can locate a new shortest path to the root node or to the new root node via a new parent node, broadcasts a subsequent load collection packet including the load count to the new parent node, and receives a new weighted distance to the root node or the new root node from the new parent node. For instance, the one node can broadcast to one or more existing child nodes an address distribution packet including the new weighted distance.

Figure 9A:
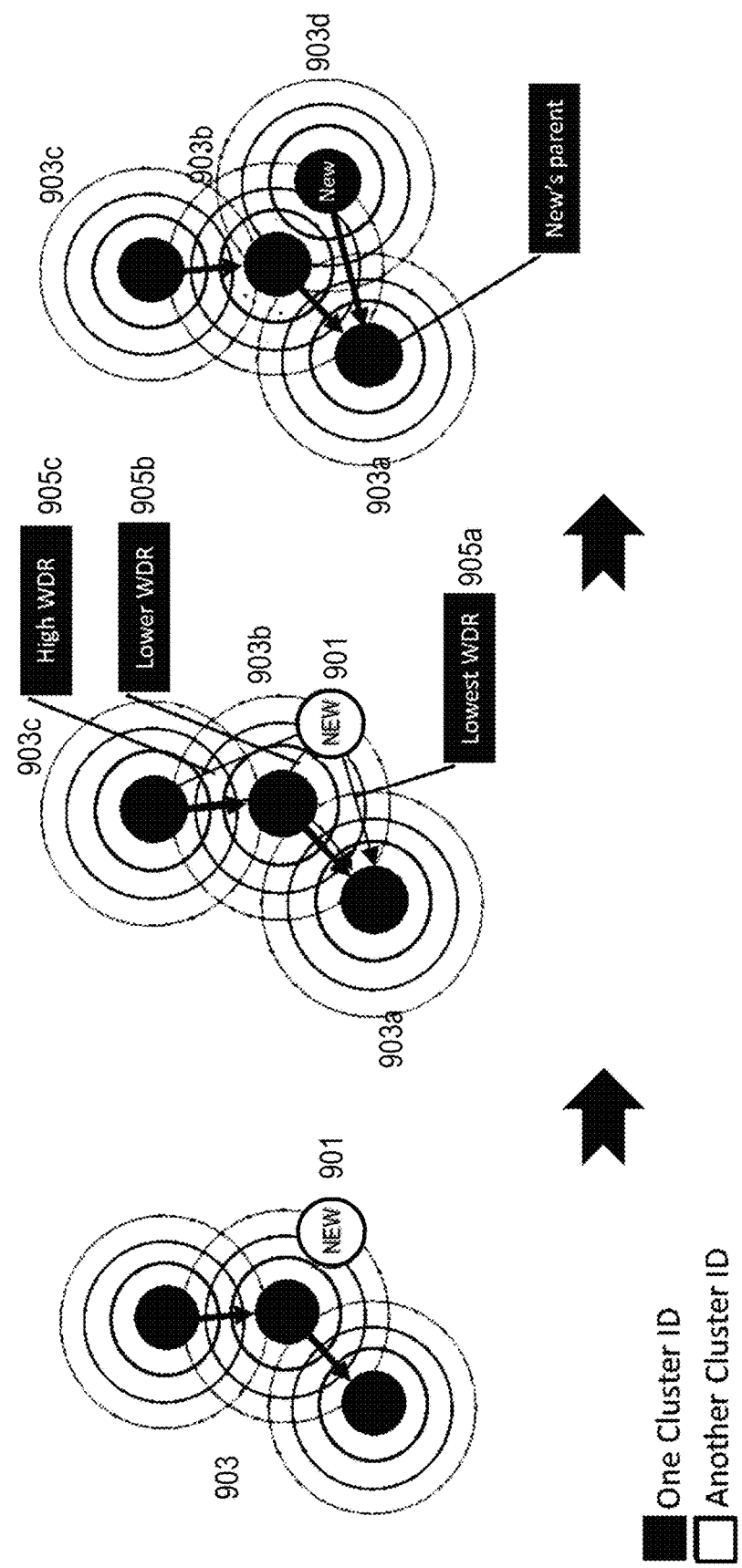

The node seeking a new parent can consider a potential parent's MAC address and Cluster ID leading to existing root node or the new root node that has the shortest WDR as its parent. The seeking node can than join the parent's Cluster ID, and start forwarding its upwards load collection packet to the MAC address of the new parent. For instance, FIG. 9A is a diagram 900 illustrating an one-node parenting example with a new node 901 moving closer to a cluster 903 that includes a root node 903*a*, a parent node 903*b*, and a leaf node 903*c*. Among the root node 903*a*, the parent node 903*b*, and the leaf node 903*c*, a route distance 905*a* directly from the new node 901 to the root node 903*a* is shortest (e.g., the lowest WDR with no hop), than a route distance 905*b* from the new node 901 via the parent node 903*b* to the root node 903*a* (e.g., a lower WDR with one hop), and a route distance 905*c* from the new node 901 via the parent node 903*b* and leaf node 903*c* to the root node 903*a* (e.g., a high WDR with two hops). As such, the shortest path formula can select the root node 903*a* as the new parent node of the new node 901, and label the new node 901 as a new child node 903d of the root node 903a. Upon receiving the load collection packet from the new child node, the new parent node can register the child node as one of its children, start forwarding its load reports to one or more upper nodes (until reaching its root node), and distribute a logical block allocated to the new parent node to existing child node(s) and the new child node.

Figure 9B:
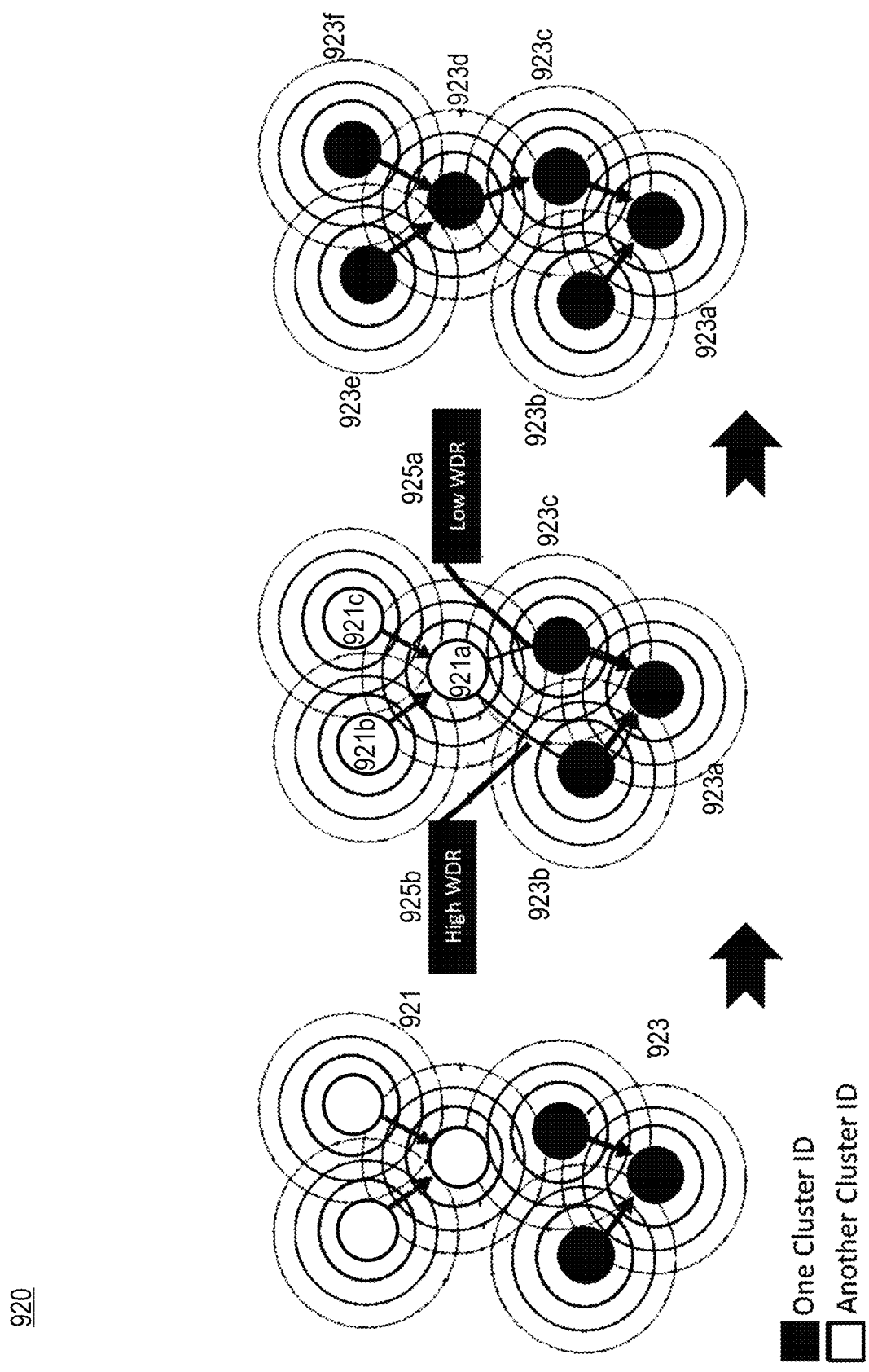

As another instance, FIG. 9B is a diagram 920 illustrating a sub-tree parenting example with a root note of one cluster attaching to a sub-tree of another cluster. For example, a cluster 921 that includes a root node 921a and two child nodes 921b, 921c moves closer to a sub-tree 923 of another cluster that includes a parent node 923a and two child nodes 923b, 923c. Since the parent node 923a is physically distant from the root node 921a thus failing a minimum RSS threshold requirement and excluded from being a parent node for the root node 921a under the shortest path formula. Between the two child nodes 923b, 923c, a route distance 925a from the root node 921a via the child node 923c to the parent node 923a (e.g., a low WDR) is physically shorter than a route distance 925b from the root node 921a via the child node 923b to the parent node 923a (e.g., a high WDR). As such, the shortest path formula can select the child node 923c as the new parent node of the root node 921a, and label the root node 921a and its two child nodes 921b, 921c as new child nodes 923d, 923e, 923f of the parent node 923a.

Figure 9C:
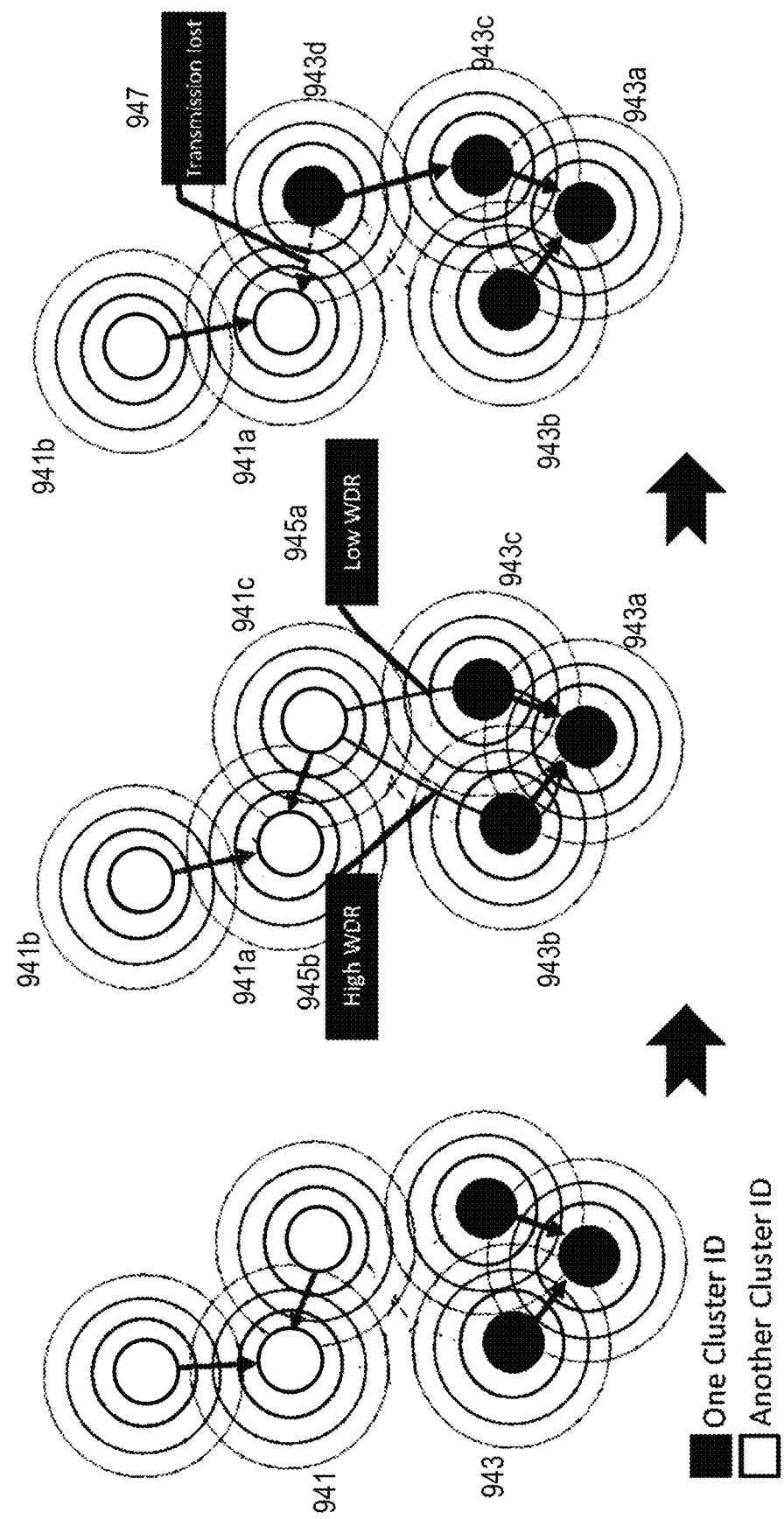

In one embodiment, when a parent node stops receiving (for a predetermined time period) upwards load collection packets from a child node, the parent node can evict the child node entry from its list of known children, and exclude the child's load from future upwards reports to one or more upper nodes. By way of example, FIG. 9C is a diagram 940 illustrating a sub-tree parenting example with a non-root note of one cluster attaching to a sub-tree of another cluster. For example, a cluster 941 that includes a root node 941a and two child nodes 941b, 941c, and a sub-tree 943 of another cluster that includes a parent node 943a and two child nodes 943b, 943c. For instance, the child node 941c either moves or changes its orientation thereby receiving a stronger signal strength from the child node 943c of the other cluster than from its own root node 941a.

Since the parent node 943a is physically distant from the child node 941c thus failing a minimum RSS threshold requirement and excluded from being a parent node the child node 941c under the shortest path formula. Between the two child nodes 943b, 943c, a route distance 945a from the child node 941c via the child node 943c to the parent node 943a (e.g., a low WDR) is physically shorter than a route distance 945b from the child node 941c via the child node 943b to the parent node 943a (e.g., a high WDR). As such, the shortest path formula can select the child node 943c as the new parent node of the child node 941c, and label the child node 941c as a new child node 943d of the parent node 943a.

In one embodiment, when the parent node of the one node stops receiving packets from the one node, the parent node can remove the one node from a list of known child nodes, and exclude the load count of the one node from a subsequent load collection packet reporting to the root node. For example, after the root node 941a stops receiving for a predetermined time period (e.g., transmission lost 947) upwards load collection packets from the child node 941c, the root node 941a can evict the child node 941c entry from its list of known children, and exclude the load of the child node 941c from its logical address data.

FIG. 9D is a diagram 960 illustrating another sub-tree parenting example with a non-root note of one cluster attaching to a sub-tree of another cluster. For example, FIG. 9D shows a sub-tree 961 of one cluster that includes a parent node 961a and a child node 961b, and a sub-tree 963 of another cluster that includes a parent node 963a, two child nodes 963b, 963c, and a grandchild node 963d. For instance, the sub-tree 961 either moves or changes its orientation thereby receiving a stronger signal strength from the sub-tree 963 of the other cluster than from its own root node.

Since the parent node 963a and the two child nodes 963b, 963c are physically distant from the parent node 961a thus failing a minimum RSS threshold requirement and excluded from being a parent node for the parent node 961a under the shortest path formula. As a result, the only option for the parent node 961a to attach to is the grandchild node 963d via a route path 965 (e.g., a WDR with two hops).

In another embodiment, when a child node stops receiving packets from the one node, the child node can become a new root node by sending an address distribution packet with a weighted distance to the new root node as zero and allocating logical addresses to one or more child nodes of the new root node based the zero weighted distance.

Figure 9E:
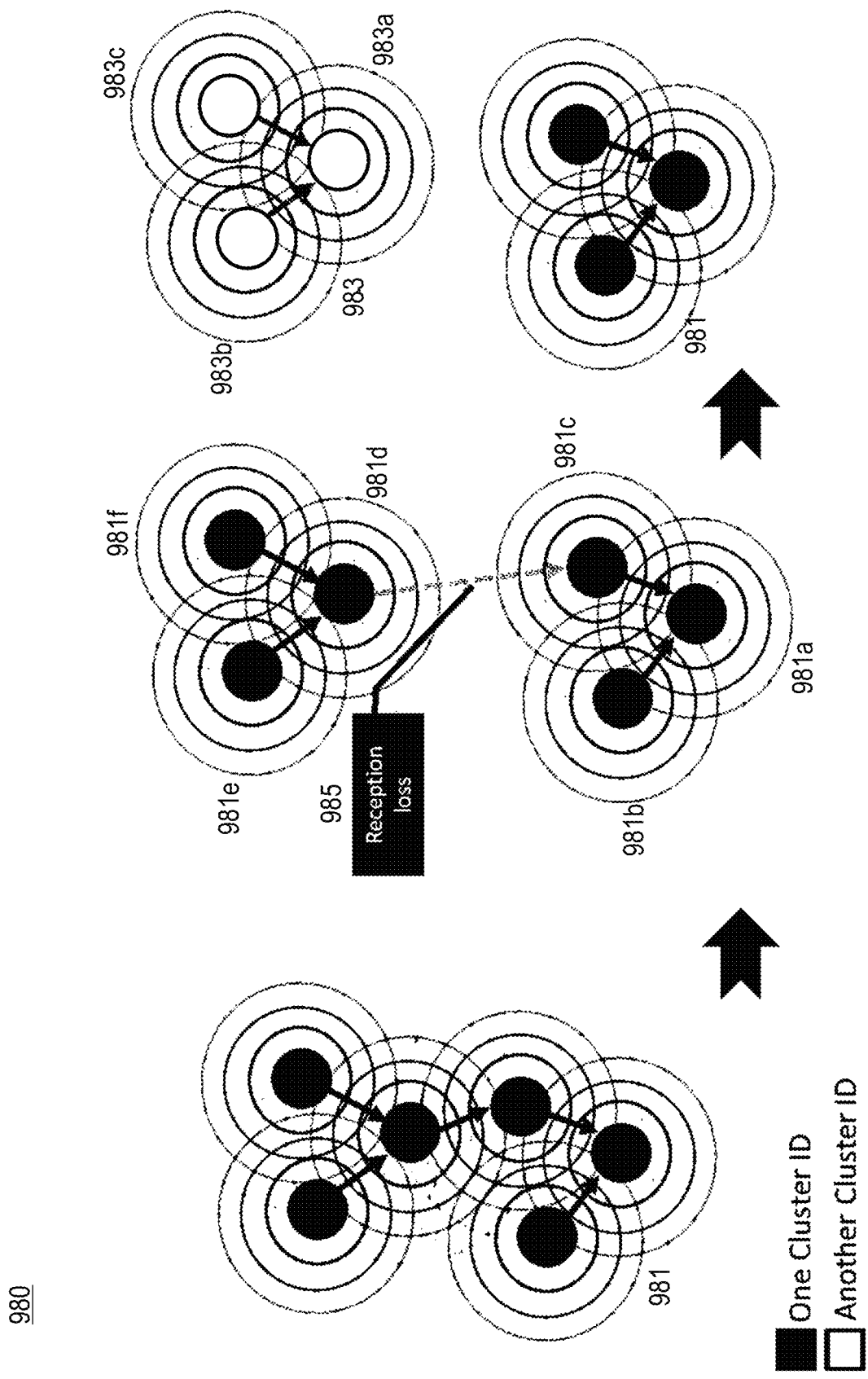

By way of example, when a child node stops receiving (for a predetermined time period) address distribution packets (including allocation blocks/ranges) from its parent, the child node can assume that it has become responsible of the subtree under it, initiate a cluster-ID-change wave downwards through its children by setting itself a WDR as zero, and re-distributing logical address ranges based on the range and starting WDR previously received from its children via a load collection wave. For instance, FIG. 9E is a diagram 980 illustrating a sub-tree detachment example with a parent note of one cluster detaching therefrom to form a new cluster. For example, a cluster 981 that includes a root node 981a, two child nodes 981b, 981c, a grandchild node 981d, and two grand grandchild nodes 981e, 981f. A sub-tree including nodes 981d, 981e, 981f moves away from the child node 981c beyond a minimum RSS threshold thereby causing a reception loss 985 and being cut off from the cluster 981 under the shortest path formula. As such, the shortest path formula can select the node 981d as a new root node 983a of a new cluster 983, and label its two child nodes 983e, 983f as new child nodes 983b, 983c of the root node 983a. The root node 983a can initiate a cluster-ID-change wave downwards through its children by setting itself a WDR as zero, and re-distribute logical address ranges based on the range and starting WDR previously received from its children via a load collection wave.

Returning to FIG. 1, in one embodiment, the mapping platform 109 performs the process for dynamic beacons address allocation and drone delivery using beacon positioning as discussed with respect to the various embodiments described herein. For example, the mapping platform 109 can generate shortest path related features for machine learning solutions (e.g., using the machine learning system 111). determine the shortest path to the root beacon R using a shortest path algorithm/formula (e.g., a Dijkstra's algorithm) that can be bases on received signal strengths (RSS), reception orientations and/or coverages, broadcasting orientations and/or coverages, a number of hops, physical distances between nodes, etc.

In one embodiment, the machine learning system 111 selects respective factors such as one or more summary statistics of the shortest paths (e.g., received signal strengths (RSS), reception orientations and/or coverages, broadcasting orientations and/or coverages, a number of hops, physical distances between nodes, etc.), 3D detailed map data of the delivery areas, package information, locations of the deliveries, package recipient population model prediction, drone sensors information and maneuverability, drone mobility graphs, weather, beacon line of sight information, target beacon mobility graphs, delivery location nearby event data (e.g., street fair, festival, etc.), etc., to determine shortest paths for beacons and cluster the beacons accordingly, and/or to maximize delivery efficiency. By way of example, the machine learning system 111 can match successful delivery statistics to a machine learning model including parameters of building shapes/dimensions e.g., building height Z, with Footprint (X, Y), and use load collection parameters in those buildings, e.g., a received signal strength (RSS) [A,B] dB, a node hop number N, yield C %, etc. of successful deliveries, to find A, B, and N for a building defined with X, Y, Z, to maximize C. In addition, these parameters can be applied to define a weighted distance to root (WDR) of a beacon node to determine beacon cluster(s).

In one embodiment, the machine learning system 111 can select or assign respective weights, correlations, relationships, etc. among the factors, to determine shortest paths for beacons and cluster the beacons accordingly. In one instance, the machine learning system 111 can continuously provide and/or update a machine learning model (e.g., a support vector machine (SVM), neural network, decision tree, etc.) during training using, for instance, supervised deep convolution networks or equivalents.

In another embodiment, the machine learning system 111 of the mapping platform 107 includes a neural network or other machine learning system to compare (e.g., iteratively) the summary statistics of the shortest paths, etc. with model data sets to determine shortest paths for beacons and cluster the beacons accordingly. In one embodiment, the neural network of the machine learning system 111 is a traditional convolutional neural network which consists of multiple layers of collections of one or more neurons (which are configured to process a portion of an input data). In one embodiment, the machine learning system 111 also has connectivity or access over the communication network 115 to the domain database 202 and/or the geographic database 113 that can each store domain data, labeled or marked beacon cluster graphs, etc.

In one embodiment the machine learning system 111 can improve the dynamic beacons address allocation and the drone delivery using beacon positioning using feedback loops based on, for example, UE/drone behavior and/or feedback data (e.g., from sensor data). In one embodiment, the machine learning system 111 can improve a machine learning model for dynamic beacons address allocation and drone delivery using beacon positioning using UE/drone behavior and/or feedback data as training data. For example, the machine learning system 111 can analyze correctly created beacon cluster graphs and/or correctly identified the shortest delivery paths, missed beacon cluster graphs and/or shortest delivery paths, etc. to determine the performance of the machine learning model.

In one embodiment, the mapping platform 109 has connectivity over the communication network 115 to the services platform 117 (e.g., an OEM platform) that provides the services 119 (e.g., probe and/or sensor data collection services). By way of example, the services 119 may also be other third-party services and include mapping services, navigation services, traffic incident services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services platform 117 uses the output (e.g. whether a road segment is closed or not) of the mapping platform 109 to provide services such as navigation, mapping, other location-based services, etc.

In one embodiment, the mapping platform 109 may be a platform with multiple interconnected components. The mapping platform 109 may include multiple servers, intelligent networking devices, computing devices, components, and corresponding software for providing parametric representations of lane lines. In addition, it is noted that the mapping platform 109 may be a separate entity of the system 100, a part of the services platform 117, a part of the one or more services 119, or included within a UE 103 (e.g., an embedded navigation system).

In one embodiment, content providers 121 may provide content or data (e.g., including beacon domain data, drone navigation task data, drone data, etc.) to the mapping platform 109, the drone 101, the beacons 102, the UEs 103, the applications 107, the services platform 117, the services 119, the domain database 202, the geographic database 113, and the machine learning system 111. The content provided may be any type of content, such as map content, textual content, audio content, video content, image content, etc. In one embodiment, the content providers 121 may provide content regarding dynamic beacons address allocation and drone delivery using beacon positioning. In one embodiment, the content providers 121 may also store content associated with the mapping platform 109, the drone 101, the beacons 102, the UEs 103, the services platform 117, the services 119, the domain database 202, the geographic database 113, and/or the machine learning system 111. In another embodiment, the content providers 121 may manage access to a central repository of data, and offer a consistent, standard interface to data, such as a repository of the domain database 202 and/or the geographic database 113.

By way of example, the UEs 103 are any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that a UE 103 can support any type of interface to the user (such as "wearable" circuitry, etc.). In one embodiment, a UE 103 may be associated with a vehicle (e.g., a mobile device) or be a component part of the vehicle (e.g., an embedded navigation system). In one embodiment, the UEs 103 may include the mapping platform 109 to allocate dynamic beacons addresses and to support drone delivery using beacon positioning.

In one embodiment, the load count can be reported from child nodes in real-time, in batches, continuously, or at any other frequency requested by the system 100 over, for instance, the communication network 115 for processing by the mapping platform 109. The beacon cluster/tree graphs can be stored in the domain database 202 and/or the geographic database 113. In one embodiment, the system 100 (e.g., via the mapping platform 109) generates beacon cluster/tree graphs as discussed with respect to the various embodiments described above to allocate dynamic beacons addresses and to support drone delivery using beacon positioning. In one embodiment, the domain data and/or the beacon cluster/tree graphs are stored in the domain database 202.

In one embodiment, as previously stated, the UEs 103 are configured with various sensors (e.g., sensors 105) for dynamic beacons address allocation and drone delivery using beacon positioning. In one embodiment, the sensed data represents sensor data associated with a beacon location or coordinates at which the sensor data was collected (e.g., a latitude and longitude pair). By way of example, the sensors 105 may include a RADAR system, a LiDAR system, global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, velocity sensors of the UEs 103, and the like.

Other examples of sensors 105 of a UE 103 may include light sensors, orientation sensors augmented with height sensors and acceleration sensor (e.g., an accelerometer can measure acceleration and can be used to determine orientation of the UE), tilt sensors to detect the degree of incline or decline of a UE 103 along a path of travel, moisture sensors, pressure sensors, etc. In a further example embodiment, sensors 105 about the perimeter of a UE 103 may detect the relative distance of the UE 103 from a beacon, the presence of other UEs, beacons, drones, and any other objects, etc. In one scenario, the sensors 105 may detect weather data, traffic information, or a combination thereof. In one embodiment, a UE 103 may include GPS or other satellite-based receivers to obtain geographic coordinates from satellites for determining current location and time. Further, the location of the UE 103 can be determined by visual odometry, triangulation systems such as A-GPS, Cell of Origin, or other location extrapolation technologies.

It is noted therefore that the above described data may be transmitted via the communication network 115 as packets according to any known wireless communication protocols. For example, each UE 103, user, beacons 102, and/or the drone 101 may be assigned a unique probe identifier (probe ID) for use in reporting or transmitting the packets collected by the drone 101, the beacons 102 and/or UEs 103. In one embodiment, each drone 101, beacon 102 and/or UE 103 is configured to transmit packets, which are individual data records for dynamic beacons address allocation and drone delivery using beacon positioning.

In one embodiment, the mapping platform 109 receives and aggregates packets gathered and/or generated by the beacons 102 and/or the UEs 103 resulting from the travel of the beacons 102 and/or the UEs 103 within or across domains, and updates the domain data and/or beacon cluster/tree graphs accordingly.

In one embodiment, the communication network 115 of the system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the drone 101, the beacons 102, UEs 103, the sensors 105, mapping platform 109, applications 107, services platform 117, services 119, content providers 121, and/or the machine learning system 111 communicate with each other and other components of the system 100 using well known, new or still developing protocols. In this context, a protocol includes a set of rules defining how the network nodes within the communication network 115 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is the to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 10:
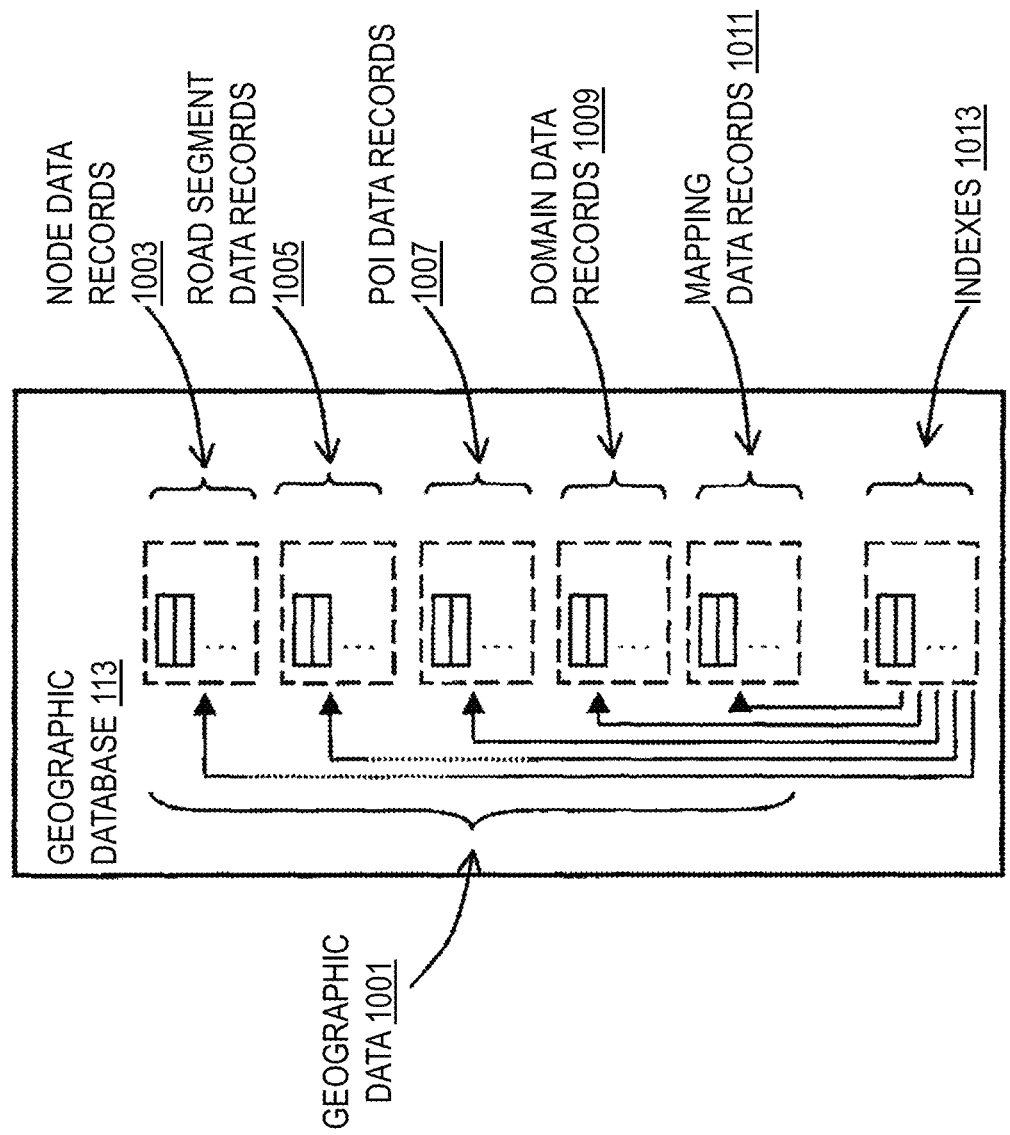
FIG. 10 is a diagram of a geographic database, according to one embodiment.

FIG. 10 is a diagram of a geographic database (such as the database 113), according to one embodiment. In one embodiment, the geographic database 113 includes geographic data 1001 used for (or configured to be compiled to be used for) mapping and/or navigation-related services, such as for video odometry based on the parametric representation of lanes include, e.g., encoding and/or decoding parametric representations into lane lines. In one embodiment, the geographic database 113 include high resolution or high definition (HD) mapping data that provide sub-meter resolution (e.g., centimeter-level, or better accuracy) of map features. For example, the geographic database 113 can be based on Light Detection and Ranging (LiDAR) or equivalent technology to collect billions of 3D points and model road surfaces and other map features down to the number lanes and their widths. In one embodiment, the mapping data (e.g., data records 1011) capture and store details such as the slope and curvature of the road, lane markings, roadside objects such as signposts, including what the signage denotes. By way of example, the mapping data enable highly automated vehicles to precisely localize themselves on the road. In another embodiment, the system 100 can use a lower resolution map for dynamic beacons address allocation and drone delivery using beacon positioning.

In one embodiment, geographic features (e.g., two-dimensional, or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 113.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 113 follows certain conventions. For example, links do not cross themselves and do not cross each other except at a node. Also, there are no duplicated shape points, nodes, or links. Two links that connect each other have a common node. In the geographic database 113, overlapping geographic features are represented by overlapping polygons. When polygons overlap, the boundary of one polygon crosses the boundary of the other polygon. In the geographic database 113, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 113 includes node data records 1003, road segment or link data records 1005, POI data records 1007, domain data records 1009, mapping data records 1011, and indexes 1013, for example. More, fewer, or different data records can be provided. In one embodiment, additional data records (not shown) can include cartographic ("carto") data records, routing data, and maneuver data. In one embodiment, the indexes 1013 may improve the speed of data retrieval operations in the geographic database 113. In one embodiment, the indexes 1013 may be used to quickly locate data without having to search every row in the geographic database 113 every time it is accessed. For example, in one embodiment, the indexes 1013 can be a spatial index of the polygon points associated with stored feature polygons.

In exemplary embodiments, the road segment data records 1005 are links or segments representing roads, streets, or paths, as can be used in the calculated route or recorded route information for determination of one or more personalized routes. The node data records 1003 are end points corresponding to the respective links or segments of the road segment data records 1005. The road link data records 1005 and the node data records 1003 represent a road network, such as used by vehicles, cars, and/or other entities. Alternatively, the geographic database 113 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 113 can include data about the POIs and their respective locations in the POI data records 1007. The geographic database 113 can also include data about places, such as cities, towns, or other communities, and other geographic features, such as bodies of water, mountain ranges, etc. Such place or feature data can be part of the POI data records 1007 or can be associated with POIs or POI data records 1007 (such as a data point used for displaying or representing a position of a city).

In one embodiment, the geographic database 113 can also include domain data records 1009 for storing domain data, beacon cluster/tree graphs, training data, prediction models, annotated observations, computed featured distributions, sampling probabilities, and/or any other data generated or used by the system 100 according to the various embodiments described herein. By way of example, the domain data records 1009 can be associated with one or more of the node records 1003, road segment records 1005, and/or POI data records 1007 to support localization or visual odometry based on the features stored therein and the corresponding estimated quality of the features. In this way, the domain data records 1009 can also be associated with or used to classify the characteristics or metadata of the corresponding records 1003, 1005, and/or 1007.

In one embodiment, as discussed above, the mapping data records 1011 model road surfaces and other map features to sub-meter resolution (e.g., centimeter-level, or better accuracy). The mapping data records 1011 also include lane models that provide the precise lane geometry with lane boundaries, as well as rich attributes of the lane models.

These rich attributes include, but are not limited to, lane traversal information, lane types, lane marking types, lane level speed limit information, and/or the like. In one embodiment, the mapping data records 1011 are divided into spatial partitions of varying sizes to provide mapping data to vehicles and other end user devices with near real-time speed without overloading the available resources of the vehicles and/or devices (e.g., computational, memory, bandwidth, etc. resources).

In one embodiment, the mapping data records 1011 are created from high-resolution 3D mesh or point-cloud data generated, for instance, from LiDAR-equipped vehicles. The 3D mesh or point-cloud data are processed to create 3D representations of a street or geographic environment at sub-meter resolution (e.g., centimeter-level accuracy) for storage in the mapping data records 1011.

In one embodiment, the mapping data records 1011 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at sub-meter resolution (e.g., centimeter-level accuracy). Other sensor data can include vehicle telemetry or operational data such as windshield wiper activation state, braking state, steering angle, accelerator position, and/or the like.

In one embodiment, the geographic database 113 can be maintained by the content provider 121 in association with the services platform 117 (e.g., a map developer). The map developer can collect geographic data to generate and enhance the geographic database 113. There can be different ways used by the map developer to collect data. These ways can include obtaining data from other sources, such as municipalities or respective geographic authorities. In addition, the map developer can employ field personnel to travel by vehicle (e.g., vehicles and/or user terminals 103) along roads throughout the geographic region to observe features and/or record information about them, for example. Also, remote sensing, such as aerial or satellite photography, can be used.

The geographic database 113 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle or a user terminal 103, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for dynamic beacons address allocation and drone delivery using beacon positioning may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof such exemplary hardware for performing the described functions is detailed below.

Figure 11:
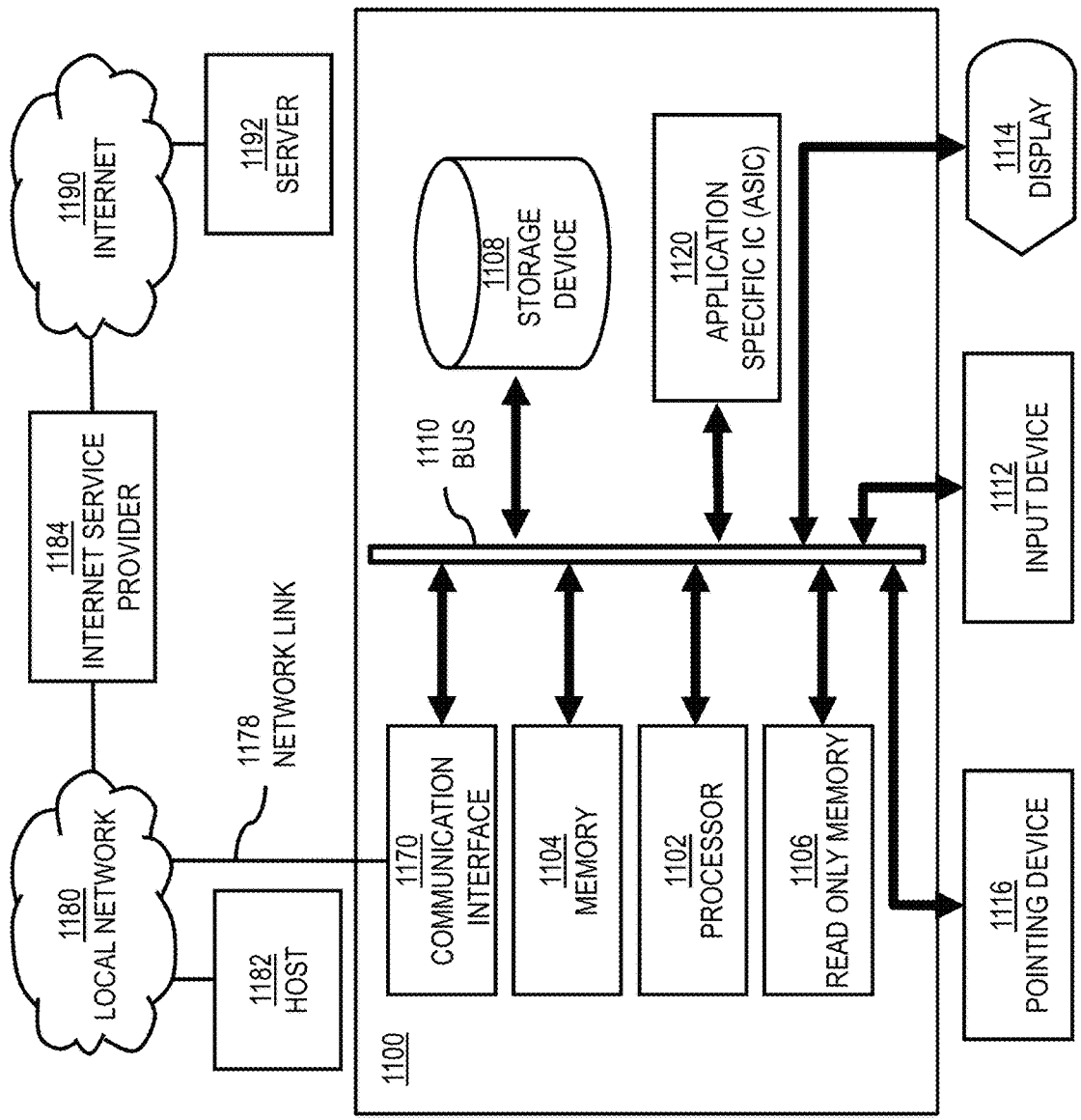
FIG. 11 is a diagram of hardware that can be used to implement an embodiment.

FIG. 11 illustrates a computer system 1100 upon which an embodiment of the invention may be implemented. Computer system 1100 is programmed (e.g., via computer program code or instructions) to dynamically allocate logical addresses to beacons and to support drone delivery using beacon positioning as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1110 includes one or more parallel conductors of information so that information is transferred quickly among devices coupled to the bus 1110. One or more processors 1102 for processing information are coupled with the bus 1110.

A processor 1102 performs a set of operations on information as specified by computer program code related to dynamic beacons address allocation and drone delivery using beacon positioning. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or other dynamic storage device, stores information including processor instructions for dynamic beacons address allocation and drone delivery using beacon positioning. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk, or flash card, for storing information, including instructions, that persists even when the computer system 1100 is turned off or otherwise loses power.

Information, including instructions for dynamic beacons address allocation and drone delivery using beacon positioning, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT) or a liquid crystal display (LCD), or plasma screen or printer for presenting text or images, and a pointing device 1116, such as a mouse or a trackball or cursor direction keys, or motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners, and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic, or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 115 for dynamic beacons address allocation and drone delivery using beacon positioning from the drone 101, the beacon 102, the UE 103, etc.

The term computer-readable medium is used herein to refer to any medium that participates in providing information to processor 1102, including instructions for execution. Such a medium may take many forms, including, but not limited to, non-volatile media, volatile media, and transmission media. Non-volatile media include, for example, optical or magnetic disks, such as storage device 1108. Volatile media include, for example, dynamic memory 1104. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system can be deployed in various configurations within other computer systems, e.g., host 1182 and server 1192.

FIG. 12 illustrates a chip set 1200 upon which an embodiment of the invention may be implemented. Chip set 1200 is programmed to dynamically allocate logical addresses to beacons and to support drone delivery using beacon positioning as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to dynamically allocate logical addresses to beacons and to support drone delivery using beacon positioning. The memory 1205 also stores the data associated with or generated by the execution of the inventive steps.

Figure 13:
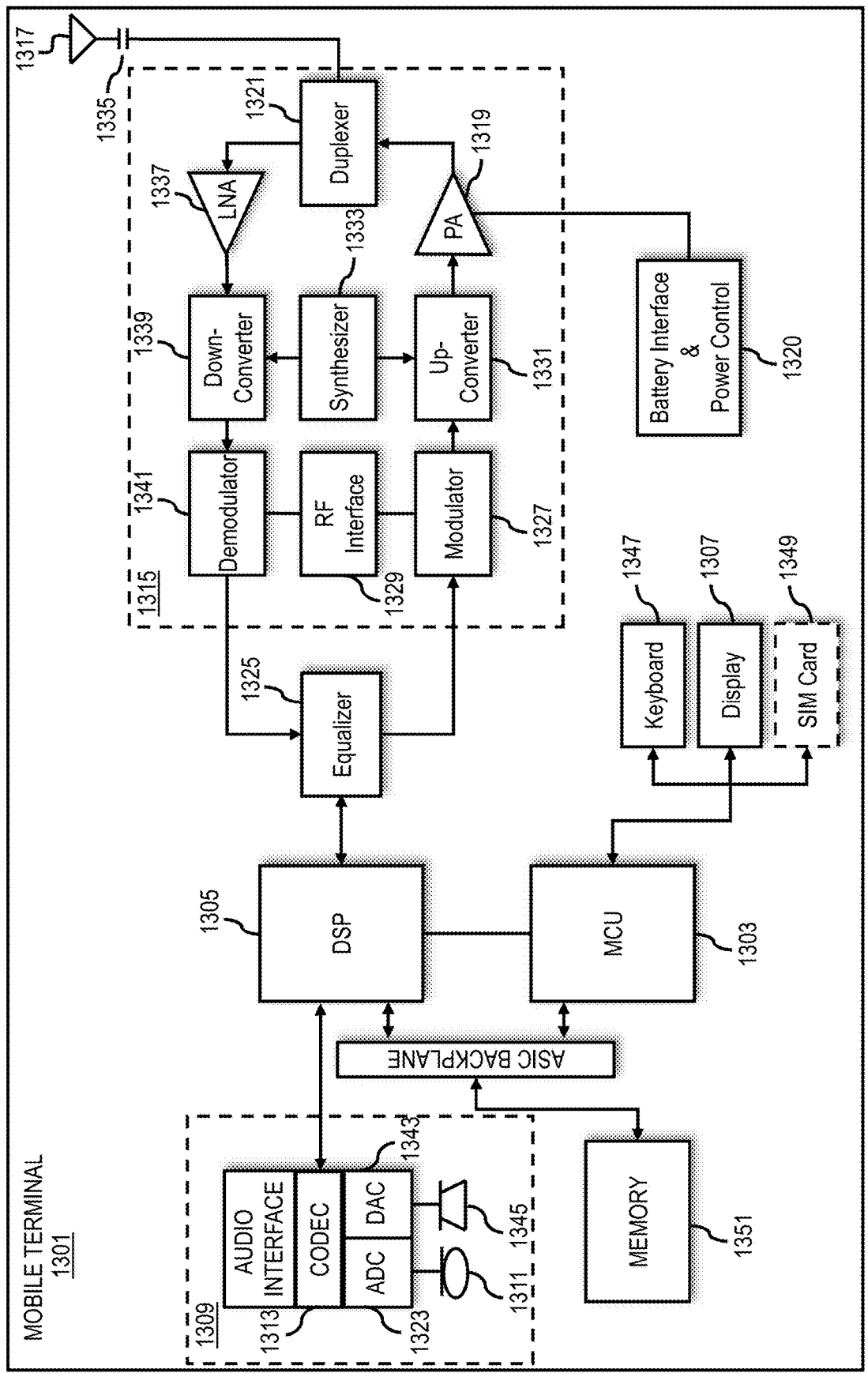
FIG. 13 is a diagram of a mobile terminal (e.g., handset or vehicle or part thereof) that can be used to implement an embodiment.

FIG. 13 is a diagram of exemplary components of a mobile terminal 1301 (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile station functions that offer automatic contact matching. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile station 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC)

1343 converts the signal and the resulting output is transmitted to the user through the speaker 1345, all under control of a Main Control Unit (MCU) 1303—which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile station 1301 to dynamically allocate logical addresses to beacons and to support drone delivery using beacon positioning. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the station. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile station 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1351 may be, but not limited to, a single memory, CD, DVD, ROM, RAM, EEPROM, optical storage, or any other non-volatile or non-transitory storage medium capable of storing digital data.

An optionally incorporated SIM card 1349 carries, for instance, important information, such as the cellular phone number, the carrier supplying service, subscription details, and security information. The SIM card 1349 serves primarily to identify the mobile station 1301 on a radio network. The card 1349 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   reporting, by each child node of a tree structure, to a parent node of said each child node, a load collection packet including a load count of said each child node, wherein each node associated via the tree structure is a beacon, wherein said each child node is either a leaf node without any other nodes reporting thereto or a parent node with one or more other nodes reporting thereto, wherein the parent node is either a root node without reporting to any other nodes in the tree structure or a child node reporting to another node in the tree structure, wherein the parent node is located on a shortest path from a leaf node to the root node measured based at least on beacon signal strengths, and wherein the load count is a total number of the one or more other nodes reporting to the parent node plus one; and
   receiving, by said each child node from the parent node, an address distribution packet that includes a contiguous range of logical addresses and a weighted distance to the root node, wherein the weighted distance of said each child node to the root node, the tree structure, or a combination thereof is provided as an input for a drone navigation task.

2. A method of claim 1, wherein the root node summates the load count directly reported by one or more parent nodes in the tree structure into a total number of nodes in the tree structure which is a total number of logical addresses in the tree structure.

3. A method of claim 2, wherein the root node divides the total number of logical addresses per parent node directly reporting to the root node based on the load count directly reported therefrom, allocates a primary contiguous range of the logical addresses per directly reporting parent node based on the division, and assigns a weighted distance to the root node from a directly reporting parent node based on the contiguous range.

4. A method of claim 3, wherein the root node broadcasts to each directly reporting parent node the address distribution packet that includes the primary contiguous range of the logical addresses and a respective weighted distance to the root node.

5. A method of claim 4, wherein each directly reporting parent node takes from the address distribution packet the primary contiguous range of the logical addresses and the respective weighted distance to the root node.

6. A method of claim 5, wherein each directly reporting parent node divides the primary contiguous range of the logical addresses among one or more child nodes reporting to said directly reporting parent node into a secondary contiguous range of the logical addresses, and calculates a weighted distance to the root node from each of the one or more child nodes by augmenting the respective weighted distance to the root node from said each directly reporting parent node with a received signal strength of the address distribution packet.

7. A method of claim 6, wherein said each directly reporting parent node broadcasts to each directly reporting child node an address distribution packet that includes the secondary contiguous range of the logical addresses and the weighted distance to the root node from said each directly reporting child node.

8. A method of claim 1, further comprising:
   initiating, by the root node, a pause of the load collection packet and the address distribution packet in response to an ongoing drone navigation task associated with the tree structure.

9. A method of claim 6, further comprising:
   determining, by one of the one or more child node, that the one child node is not a leaf node based on that the secondary contiguous range is more than one; and
   dividing, by the one child node, the secondary contiguous range of the logical addresses over one or more child nodes directly reported thereto based on a respective load count.

10. A method of claim 1, wherein the root node, the leaf node, the parent node, said each child node, or a combination thereof listen to one or more load collection packets, one or more address distribution packets, or a combination thereof transmitted by one or more neighboring nodes to locate a new shortest path to the root node or to a new root node of another tree structure.

11. A method of claim 10, wherein one of the root node, the leaf node, the parent node, and said child node locates a new shortest path to the root node or to the new root node via a new parent node, broadcasts a subsequent load collection packet including the load count to the new parent node, and receives a new weighted distance to the root node or the new root node from the new parent node.

12. A method of claim 11, wherein the one node broadcasts to one or more existing child nodes an address distribution packet including the new weighted distance.

13. A method of claim 11, wherein when the parent node of the one node stops receiving packets from the one node, the parent node removes the one node from a list of known child nodes, and excludes the load count of the one node from a subsequent load collection packet reporting to the root node.

14. A method of claim 11, wherein when a child node stops receiving packets from the one node, the child node becomes a new root node by sending an address distribution packet with a weighted distance to the new root node as zero and allocating logical addresses to one or more child nodes of the new root node based the zero weighted distance.

15. An apparatus comprising:
at least one processor; and
at least one memory including computer program code for one or more programs,
the at least one memory and the computer program code configured to, with the at least one processor, cause the apparatus to perform at least the following,
receive, by a root node of a tree structure from each child node of the root node, a load collection packet including a load count of said each child node, wherein each node associated via the tree structure is a beacon, wherein said each child node is either a leaf node without any other nodes reporting thereto or a parent node with one or more other nodes reporting thereto, wherein the parent node is either the root node without reporting to any other nodes in the tree structure or a child node reporting to another node in the tree structure, wherein the parent node is located on a shortest path from a leaf node to the root node measured based at least on beacon signal strengths, and wherein the load count is a total number of the one or more other nodes reporting to the parent node plus one; and
transmit, from the root node to said each child node, an address distribution packet that includes a contiguous range of logical addresses and a weighted distance to the root node,
wherein the weighted distance of said each child node to the root node, the tree structure, or a combination thereof is provided as an input for a drone navigation task.

16. The apparatus of claim 15, wherein the apparatus is further caused to:
summate the load count directly reported by said each child node of the root node into a total number of nodes in the tree structure which is a total number of logical addresses in the tree structure.

17. The apparatus of claim 16, wherein the apparatus is further caused to:
divide the total number of logical addresses per said each child node of the root node based on the load count directly reported therefrom;
allocate a primary contiguous range of the logical addresses per said each child node of the root node based on the division; and
assign a weighted distance to the root node from said each child node of the root node based on the contiguous range.

18. A non-transitory computer readable storage medium including one or more sequences of one or more instructions which, when executed by one or more processors, cause an apparatus to at least perform:
receiving, by a parent node of a tree structure from each child node of the parent node, a load collection packet including a load count of said each child node, wherein each node associated via the tree structure is a beacon, wherein said each child node is either a leaf node without any other nodes reporting thereto or a parent node with one or more other nodes reporting thereto, wherein the parent node is either a root node of the tree structure without reporting to any other nodes in the tree structure or a child node reporting to another node in the tree structure, wherein the parent node is located on a shortest path from a leaf node to the root node measured based at least on beacon signal strengths, and wherein the load count is a total number of the one or more other nodes reporting to the parent node plus one; and
transmitting, from the parent node to said each child node, an address distribution packet that includes a contiguous range of logical addresses and a weighted distance to the root node,
wherein the weighted distance of said each child node to the root node, the tree structure, or a combination thereof is provided as an input for a drone navigation task.

19. The non-transitory computer readable storage medium of claim 18, wherein the apparatus is further caused to perform:
summating the load count directly reported by said each child node of the parent node into a total number of nodes in the tree structure which is a total number of logical addresses in the tree structure.

20. The non-transitory computer readable storage medium of claim 19, wherein the apparatus is further caused to perform:
dividing the total number of logical addresses per said each child node of the parent node based on the load count directly reported therefrom;
allocating a primary contiguous range of the logical addresses per said each child node of the parent node based on the division; and
assigning a weighted distance to the root node from said each child node of the parent node based on the contiguous range.

* * * * *